(12) United States Patent
Jeong et al.

(10) Patent No.: US 10,930,126 B1
(45) Date of Patent: Feb. 23, 2021

(54) MOTION SENSING FOR ELECTRONIC DEVICES

(71) Applicant: Amazon Technologies, Inc., Seattle, WA (US)

(72) Inventors: Changsoo Jeong, Rancho Palos Verdes, CA (US); James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/243,610

(22) Filed: Jan. 9, 2019

Related U.S. Application Data

(60) Provisional application No. 62/616,391, filed on Jan. 11, 2018.

(51) Int. Cl.
*G08B 13/196* (2006.01)
*H04N 5/232* (2006.01)

(52) U.S. Cl.
CPC . *G08B 13/19695* (2013.01); *G08B 13/19636* (2013.01); *H04N 5/232411* (2018.08)

(58) Field of Classification Search
None
See application file for complete search history.

(56) References Cited

U.S. PATENT DOCUMENTS

| | | | |
|---|---|---|---|
| 4,764,953 A | 8/1988 | Chern et al. | |
| 5,428,388 A | 6/1995 | von Bauer et al. | |
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |

(Continued)

FOREIGN PATENT DOCUMENTS

| | | |
|---|---|---|
| CN | 2585521 | 11/2003 |
| CN | 2792061 | 6/2006 |

(Continued)

*Primary Examiner* — Christopher Braniff
(74) *Attorney, Agent, or Firm* — Lee & Hayes, P.C.

(57) ABSTRACT

This application is directed to an electronic device that uses at least a low-power computer vision component to determine whether to activate a camera. For instance, the electronic device may cause the camera to operate in a low-power mode, such as by turning the camera off. The electronic device may then detect motion of an object using a motion sensor. Additionally, the electronic device may generate first image data using the computer vision component, where the first image data represents the object. After generating the first image data, the electronic device may use the computer vision component to analyze the first the image data in order to determine that the object includes a type of object, such as a person. Based at least in part on the determination, the electronic device may activate the camera and generate second image data using the camera.

23 Claims, 32 Drawing Sheets

(56) References Cited

U.S. PATENT DOCUMENTS

| | | |
|---|---|---|
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,438,465 B1 * | 10/2019 | Bart ............... H04N 7/183 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2013/0057695 A1 | 3/2013 | Huisking |
| 2014/0267716 A1 | 9/2014 | Child et al. |
| 2015/0035987 A1 | 2/2015 | Fernandez |
| 2015/0163463 A1 | 6/2015 | Hwang et al. |
| 2015/0331480 A1 * | 11/2015 | Zhou ............... G06F 3/005 |
| | | 345/156 |
| 2018/0176512 A1 | 6/2018 | Siminoff |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

* cited by examiner

MOTION SENSING FOR ELECTRONIC DEVICES

RELATED APPLICATIONS

This application claims priority to U.S. Provisional Patent Application No. 62/616,391, filed Jan. 11, 2018, titled "MOTION SENSING AND POWER CONSUMPTION CONTROL FOR AUDIO/VIDEO RECORDING AND COMMUNICATION DEVICES," the entire contents of which are incorporated herein by reference.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, e.g., video doorbell systems, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of an A/V recording and communication device at the entrance to a home, or at strategic locations around the exterior of a home acts as a powerful deterrent against would-be burglars.

BRIEF DESCRIPTION OF THE DRAWINGS

The various embodiments of the present motion sensing and power consumption control for audio/video (A/V) recording and communication devices now will be discussed in detail with an emphasis on highlighting the advantageous features. These embodiments depict the novel and non-obvious motion sensing and power consumption control for A/V recording and communication devices shown in the accompanying drawings, which are for illustrative purposes only. These drawings include the following figures, in which like numerals indicate like parts.

DETAILED DESCRIPTION

Figure 1:
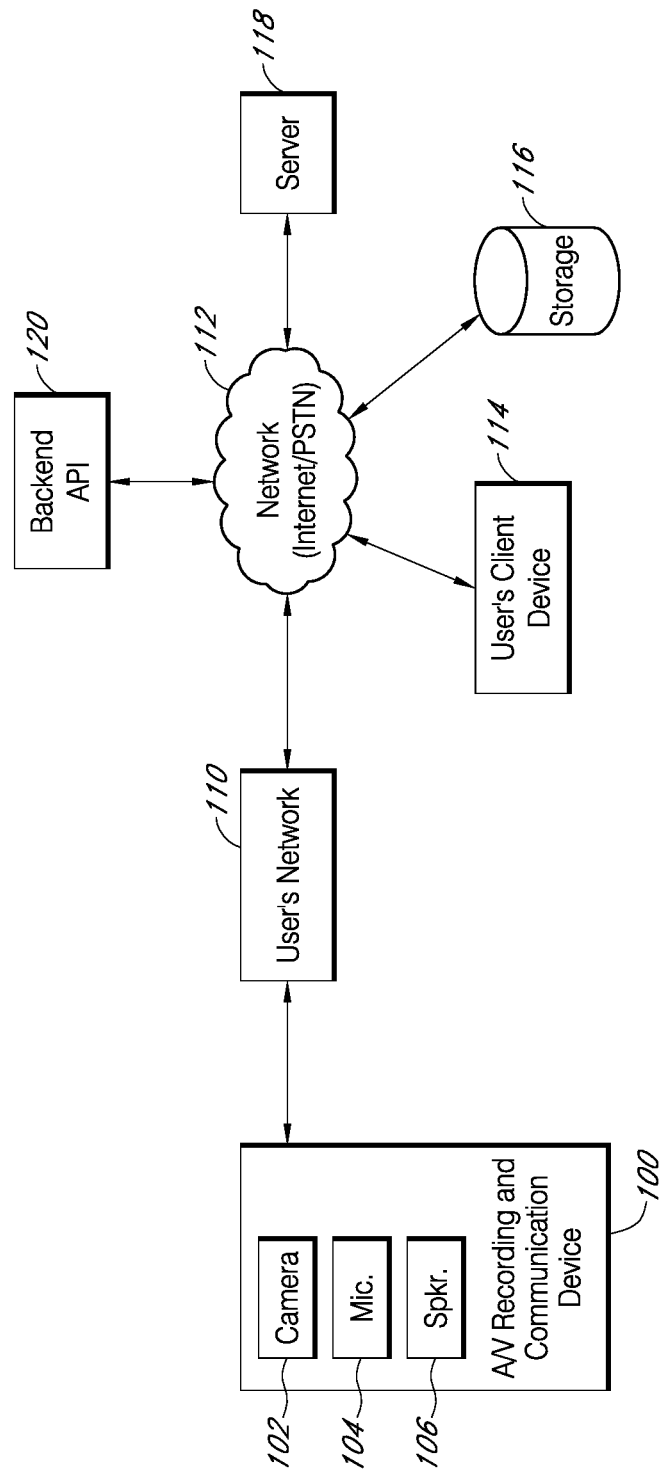
FIG. 1 is a functional block diagram illustrating one embodiment of a system including an A/V recording and communication device ("A/V device") according to various aspects of the present disclosure.

One aspect of the present embodiments includes the realization that audio/video recording and communication devices ("A/V devices"), other than those described herein, sometimes suffer from issues with respect to motion sensing accuracy versus power consumption. For example, motion sensing is often accomplished by using one or more passive infrared (PIR) sensors. PIR sensors generally sense motion by sensing changes in the amount of infrared radiation received by the PIR sensor. For example, when a person moves into the field of view (FOV) of a PIR sensor, the PIR sensor detects a change in the amount of infrared radiation that it is receiving, creating a voltage change at the output of the PIR sensor, which is interpreted by a processor receiving the voltage signal as indicating that motion has been sensed by the PIR sensor. PIR sensors have the advantage that they generally consume low amounts of power compared to other motion sensor devices and techniques. PIR sensors also have the advantage that they do not require the presence or use of other devices to generate radiation to be received, thereby contributing to their ease of use. Further, PIR sensors have the advantage that they can detect motion within a predetermined area or field of view and are not limited to a single line or point in space.

That said, PIR sensors have disadvantages. For example, PIR sensors sometimes generate false positives from motion that may be considered unimportant. For example, these devices may sense motion of animals, swaying tree branches, and other motion that is not related to a person coming into the field of view of the camera, and may therefore cause a camera to record image data of these unimportant events. Likewise, prior art efforts to prevent such false positives can sometimes result in failures to record motion caused by a person, which motion is more likely to be important and should therefore be recorded by the camera of the A/V device. Further, sometimes direct sunlight on a PIR sensor can cause such false positives and/or failures to record. Moreover, glare from a car window, a building window, a glass door that regularly opens and closes, etc., can cause false positives and/or failures to trigger a motion alert depending upon the particular design and configuration of the PIR sensor. These false positives and failures to record are often exacerbated by varying light conditions, ranging from full daylight, to dawn/dusk, to full night.

Motion sensing is also sometimes accomplished using active infrared (AIR) sensors. AIR sensors are generally configured to emit radiation, such as infrared radiation, and then measure either the presence or absence of the emitted infrared radiation at a receiver. AIR sensors are also sometimes referred to as "photoelectric sensors." They may include various types of sensors, including "through-beam" sensors, "retro-reflective" sensors, and "diffuse-reflective" sensors. For example, a through-beam sensor transmits a beam of light from a transmitter to a separately positioned receiver. If a person or object blocks or breaks the beam of light, the sensor detects this and converts it to an electrical output indicating that motion has been detected. A retro-reflective sensor functions in a similar manner, except that the transmitter and the receiver are in the same unit. The transmitter transmits a beam of light to a separately positioned reflector, and the beam of light is reflected back to the receiver. If the beam of light is interrupted, the sensor is triggered. A diffuse-reflective sensor operates in a somewhat different manner. The diffuse-reflective sensor has a transmitter and receiver in a single unit, and transmits a beam of light at a particular wavelength, but there is no separately positioned receiver or reflector. Instead, if the beam of light is reflected to some degree, e.g., a diffuse reflection, by an object, some of the radiation of that diffuse reflection will be reflected back to the receiver. If sufficient radiation on the particular wavelength is received by the receiver, the sensor detects this and converts it to an electrical output indicating that the beam has been interrupted and motion has been detected. Further, while these devices are referred to herein generally as active infrared sensors, it should be understood that such sensors may use radiation that is in the visible spectrum, such as a red light, a red laser, a green light or a blue light. AIR sensors have the advantage that they are generally more accurate at sensing motion (or the presence of a person or object in the beam of the device) than PIR sensors. However, AIR sensors consume significantly more power than PIR sensors. Additionally, AIR sensors are limited in the area that they can cover, as they sense motion by the interruption or reflection of a beam of light and can therefore only sense motion along the path of the beam of light.

Motion sensing is also sometimes accomplished using computer vision analysis of video taken by a video camera. While many variations of techniques and algorithms to do so exist, they generally use electronic circuitry and executable instructions to compare video images taken over a certain time span to determine if the image has changed, and if it has, to determine if the change to the image shows a person or object entering the field of view of the video camera. Motion sensing by computer vision analysis of video images has the advantage that it is frequently very accurate in determining that motion has occurred and correctly assessing the source of the motion. However, it has the disadvantages of being relatively slower than either PIR sensors or AIR sensors. Further, it has the disadvantage of consuming relatively larger amounts of power than either PIR sensors or AIR sensors. Finally, it also typically requires more and larger physical components to sense motion than a PIR sensor or an AIR sensor, e.g., both a video camera and a processor running the executable computer vision analysis instructions.

Motion sensing is also sometimes accomplished using computer vision analysis of real-time images. For example, Qualcomm Technologies, Inc. of San Diego, Calif. has developed a small, integrated, low-power computer vision module (ILP-CVM), offered commercially as the "Glance," which can be integrated into a wide variety of battery-powered and line-powered devices, to perform object detection, feature recognition, and change/motion detection. The ILP-CVM includes a lens for focusing an image, a complementary metal-oxide semiconductor (CMOS) image sensor onto which the image is focused, and a digital processor engine that performs embedded image processing within the module and outputs post-processed metadata about the image, rather than raw image data. It provides a number of advantages in that it has lower power consumption than other computer vision analysis solutions discussed above, and may be faster than such other computer vision analysis solutions. The ILP-CVM, however, has the disadvantages that it still typically consumes more power than PIR sensors and is significantly more expensive than PIR sensors or AIR sensors.

One aspect of the present embodiments includes the realization that each of the above-described motion sensing devices has advantages over the other devices, but also disadvantages when compared to the other devices, thus resulting in tradeoffs when one of these devices is selected for a given application. The present embodiments solve this problem by combining the functionalities of these devices in novel combinations to provide numerous advantages. Example advantages of the present embodiments include, without limitation, improved accuracy for motion sensing, and improved accuracy for determining that the source of motion is a person or other potentially threatening source, rather than a non-threatening animal (such as a squirrel or a bird) or environmentally-caused motion (such as tree branches moving in the wind), while at the same time reducing and controlling the amount of power consumption that would otherwise occur when these above-described motion sensing devices are used independently.

The following detailed description describes the present embodiments with reference to the drawings. In the drawings, reference numbers label elements of the present embodiments. These reference numbers are reproduced below in connection with the discussion of the corresponding drawing features.

The embodiments of the present motion sensing and power consumption control for A/V devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video recording and communication device ("A/V device") 100. The A/V device 100 may in some embodiments comprise a doorbell, and may be located near the entrance to a structure (not shown), such as a dwelling, a business, a storage facility, etc. The A/V device 100 includes a camera 102, a microphone 104, and a speaker 106. The camera 102 may comprise, for example, a high definition (HD) video camera, such as one capable of capturing video images at an image display resolution of 720p, or 1080p, or better. While not shown, the A/V device 100 may also include other hardware and/or components, such as a housing, one or more motion sensors (and/or other types of sensors), a button, etc. The A/V device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V device 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V device 100, the A/V device 100 detects the visitor's presence and begins capturing video images within a field of view of the camera 102. The A/V device 100 may also capture audio through the microphone 104. The A/V device 100 may detect the visitor's presence by detecting motion using the camera 102 and/or a motion sensor, and/or by detecting that the visitor has depressed the front button on the A/V device 100 (in embodiments in which the A/V device 100 comprises a doorbell).

In response to the detection of the visitor, the A/V device 100 sends an alert to the user's client device 114 (FIG. 1) via the user's network 110 and the network 112. The A/V device 100 also sends streaming video, and may also send streaming audio, to the user's client device 114. If the user answers the alert, two-way audio communication may then occur between the visitor and the user through the A/V device 100 and the user's client device 114. The user may view the visitor throughout the duration of the call, but the visitor cannot see the user (unless the A/V device 100 includes a display, which it may in some embodiments).

The video images captured by the camera 102 of the A/V device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
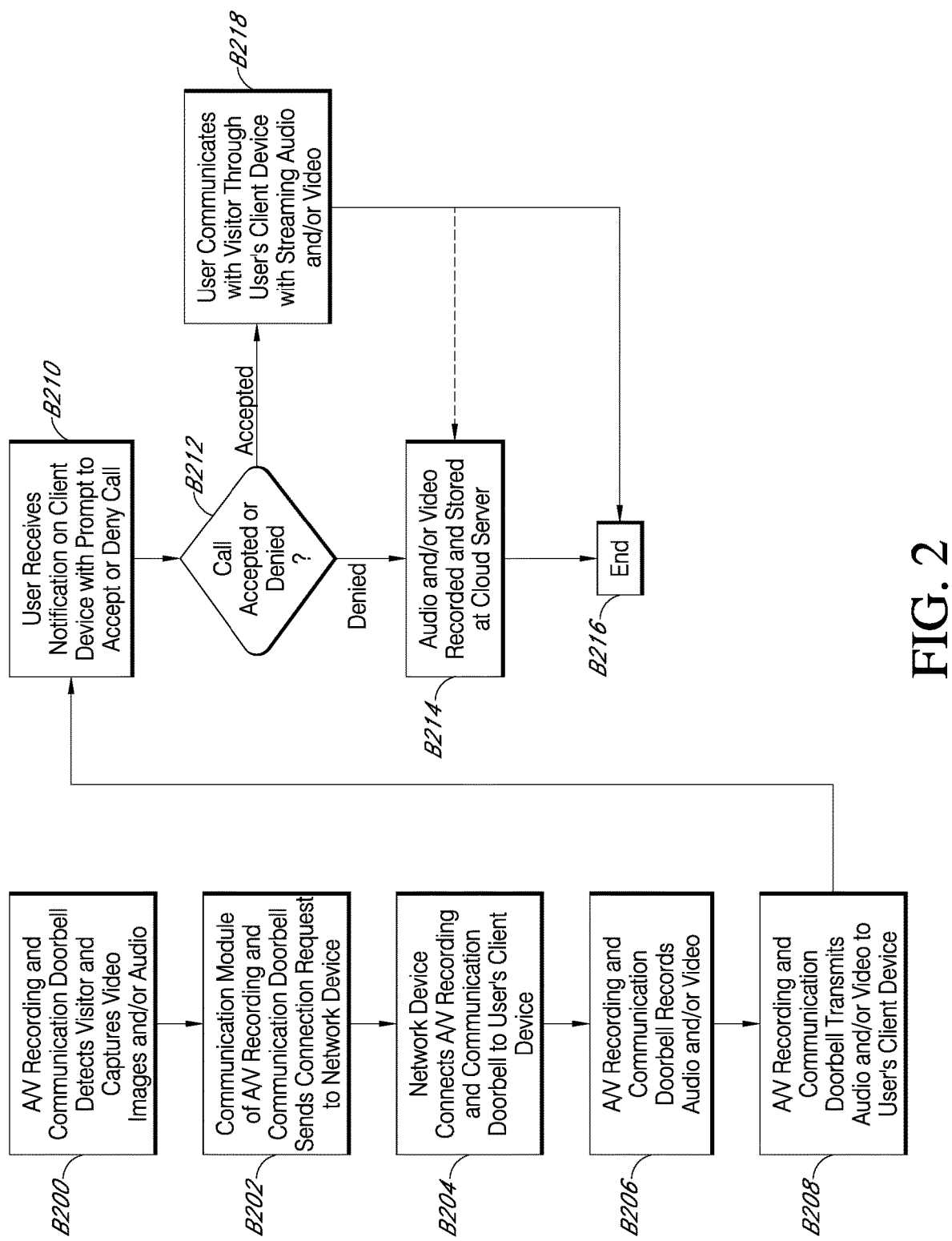
FIG. 2 is a flowchart illustrating one embodiment of a process for streaming and storing A/V content from an A/V recording and communication doorbell system according to various aspects of the present disclosure.

FIG. 2 is a flowchart illustrating a process for streaming and storing A/V content from an A/V recording and communication doorbell system according to various aspects of the present disclosure. At block B200, the A/V device 100 detects the visitor's presence and begins capturing video images within a field of view of the camera 102. The A/V device 100 may also capture audio through the microphone 104. As described above, the A/V device 100 may detect the visitor's presence by detecting motion using the camera 102 and/or a motion sensor, and/or by detecting that the visitor has depressed the front button on the A/V device 100 (in embodiments in which the A/V device 100 comprises a doorbell).

At block B202, a communication module of the A/V device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V device 100 to the user's client device 114 through the user's network 110 and the network 112. At block B206, the A/V device 100 may record available audio and/or video data using the camera 102, the microphone 104, and/or any other sensor available. At block B208, the audio and/or video data is transmitted (streamed) from the A/V device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V device 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V device 100 and the session ends at block B216. In some embodiments, the audio and/or video data may be recorded and stored at a cloud server (block B214)

even if the user accepts the notification and communicates with the visitor through the user's client device 114.

Many of today's homes include a wired doorbell system that does not have A/V communication capabilities. Instead, standard wired doorbell systems include a button outside the home next to the front door. The button activates a signaling device (such as a bell or a buzzer) inside the building. Pressing the doorbell button momentarily closes the doorbell circuit, which may be, for example, a single-pole, single-throw (SPST) push button switch. One terminal of the button is wired to a terminal on a transformer. The transformer steps down the 120-volt or 240-volt household AC electrical power to a lower voltage, typically 16 to 24 volts. Another terminal on the transformer is wired to a terminal on the signaling device. Another terminal on the signaling device is wired to the other terminal on the button. A common signaling device includes two flat metal bar resonators, which are struck by plungers operated by two solenoids. The flat bars are tuned to different notes. When the doorbell button is pressed, the first solenoid's plunger strikes one of the bars, and when the button is released, a spring on the plunger pushes the plunger up, causing it to strike the other bar, creating a two-tone sound ("ding-dong").

Many current A/V recording and communication doorbell systems (other than the present embodiments) are incompatible with existing wired doorbell systems of the type described in the preceding paragraph. One reason for this incompatibility is that the A/V recording and communication doorbell ("A/V doorbell") draws an amount of power from the household AC electrical power supply that is above the threshold necessary for causing the signaling device to sound. The A/V doorbell thus causes frequent inadvertent sounding of the signaling device, which is not only bothersome to the home's occupant(s), but also undermines the usefulness of the doorbell. The present embodiments solve this problem by limiting the power consumption of the A/V doorbell to an amount that is below the threshold necessary for causing the signaling device to sound. Embodiments of the present A/V doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V doorbell can be powered on continuously. In a typical battery-powered A/V doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also because the camera is able to be powered on continuously, it can be used for motion detection, thus eliminating any need for a separate motion detection device, such as a passive infrared sensor (PIR). Eliminating the PIR simplifies the design of the A/V doorbell and enables the doorbell to be made more compact. Also because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V doorbell and enabling the doorbell to be made even more compact.

Figure 3:
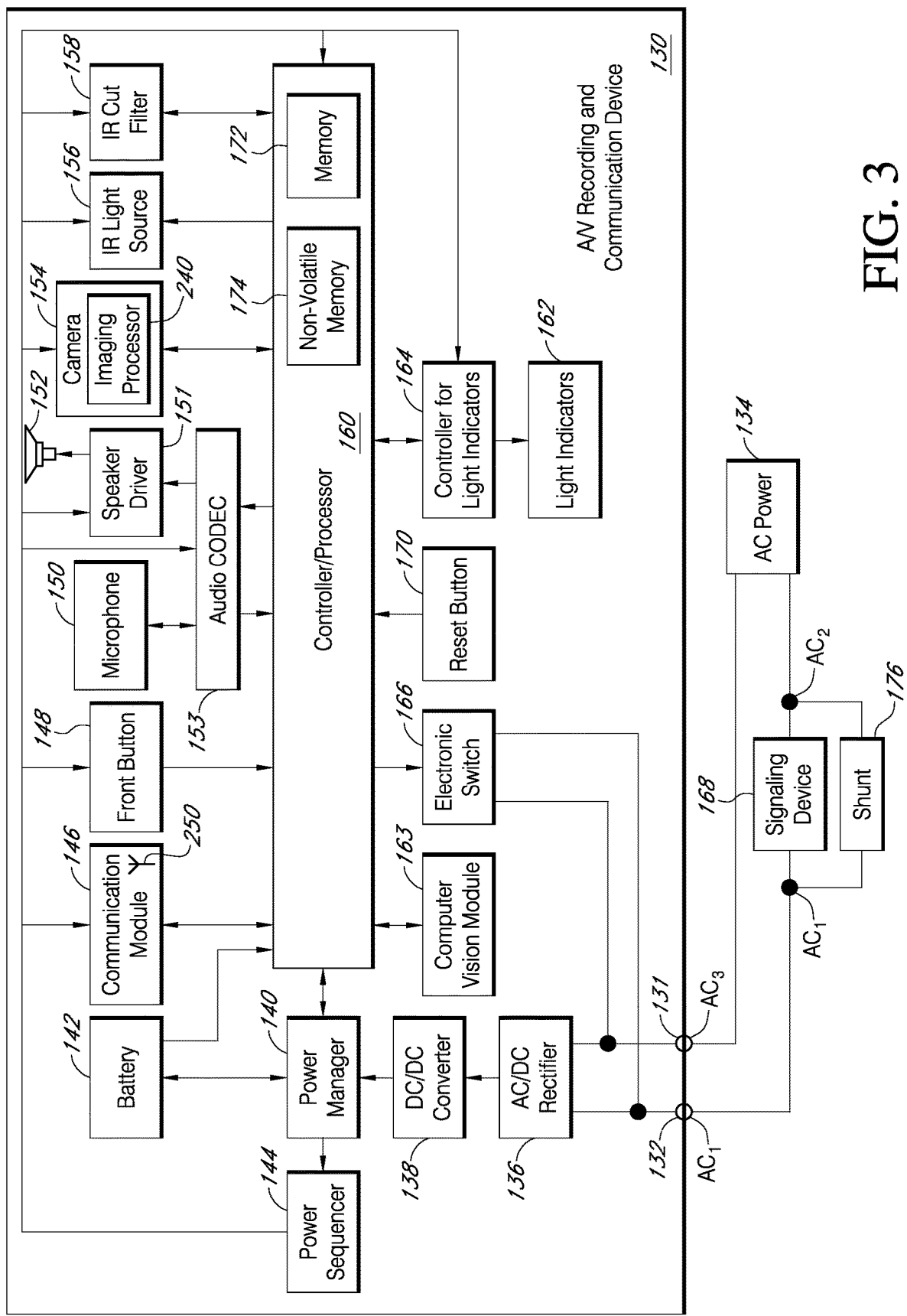
FIG. 3 is a functional block diagram illustrating an embodiment of an A/V recording and communication doorbell system according to the present disclosure.

FIGS. 3-13 illustrate one embodiment of a low-power-consumption A/V recording and communication doorbell ("A/V doorbell") 130 according to various aspects of the present disclosure. FIG. 3 is a functional block diagram illustrating various components of the A/V doorbell 130 and their relationships to one another. For example, the A/V doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V doorbell 130 further comprises an electronic switch 166 that closes when the front button 148 is depressed. When the electronic switch 166 closes, power from the AC power source 134 is diverted through a signaling device 168 that is external to the A/V doorbell 130 to cause the signaling device 168 to emit a sound, as further described below. In one non-limiting example, the electronic switch 166 may be a triac device.

The A/V doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

Figure 4:
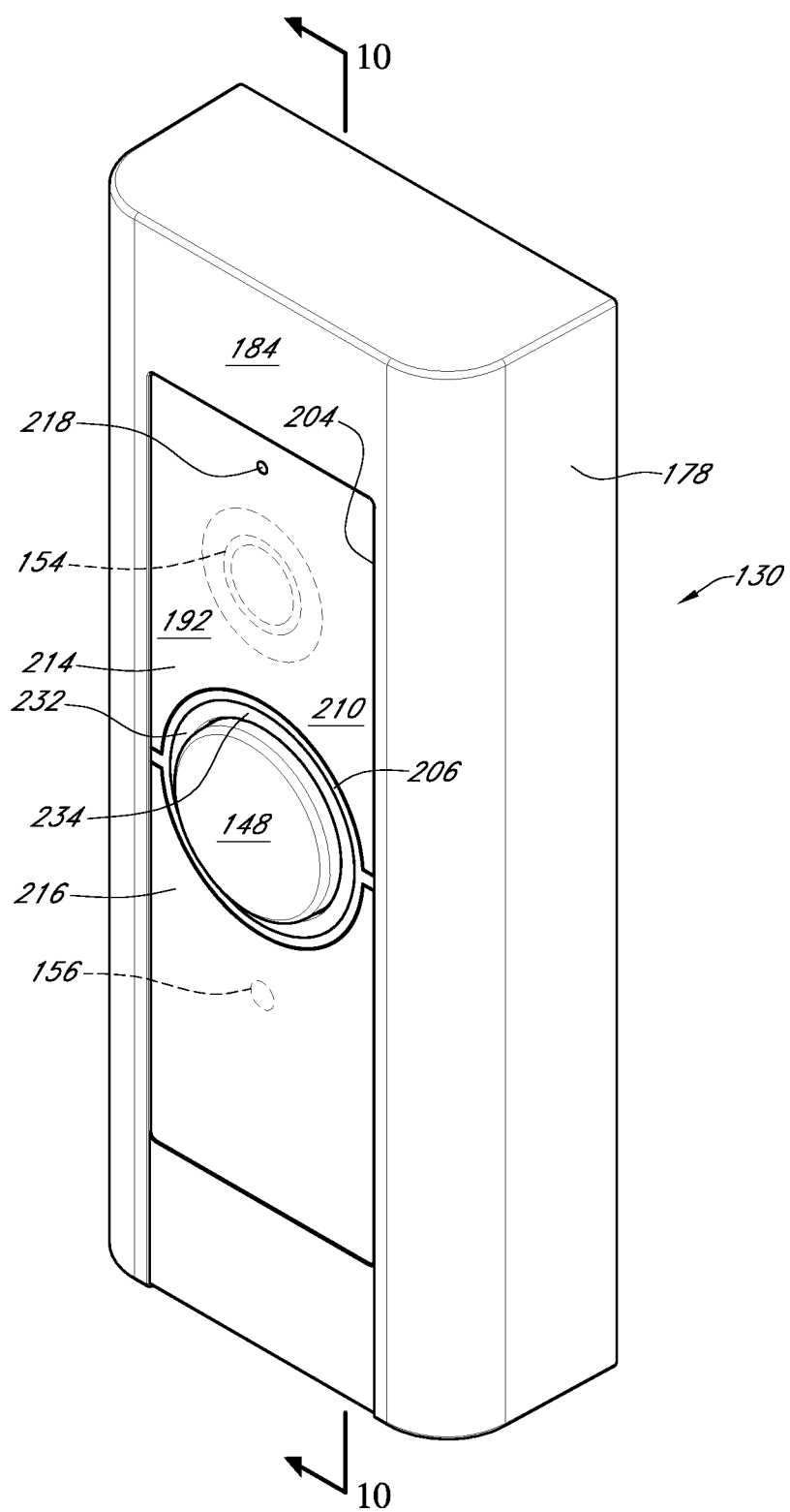
FIG. 4 is a front perspective view of an embodiment of an A/V recording and communication doorbell according to the present disclosure.
Figure 5:
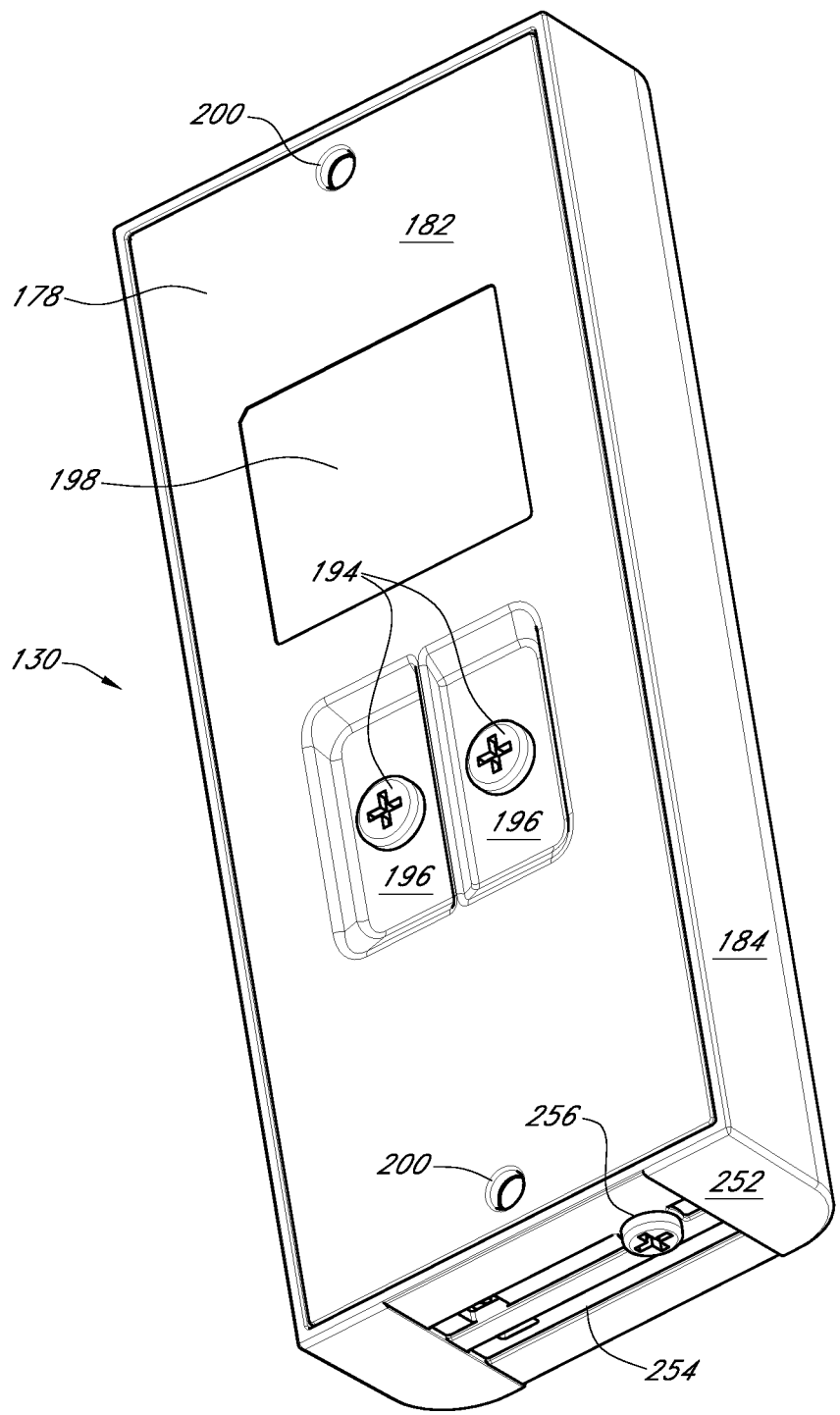
FIG. 5 is a rear perspective view of the A/V recording and communication doorbell of FIG. 4.
Figure 6:
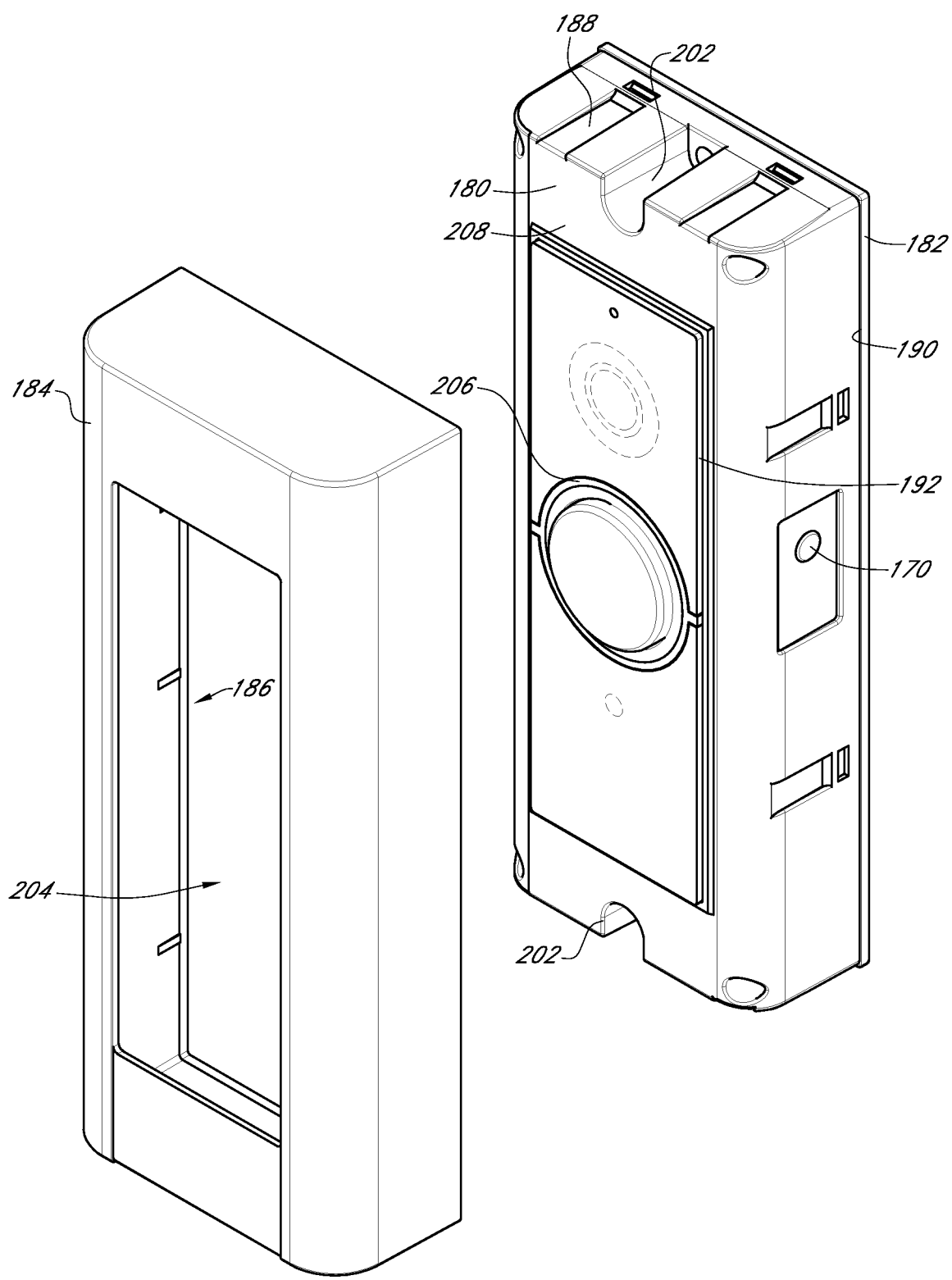
FIG. 6 is a partially exploded front perspective view of the A/V recording and communication doorbell of FIG. 4 showing the cover removed.

With reference to FIGS. 4-6, the A/V doorbell 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V doorbell 130. For example, the A/V doorbell 130 may be packaged and sold with multiple shells 184 in different colors in the same package.

With reference to FIG. 4, a front surface of the A/V doorbell 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the A/V doorbell 130). With further reference to FIG. 4, the A/V doorbell 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V doorbell 130. The terminal screws 194 are configured to receive electrical wires to connect to the A/V doorbell 130, through the terminals 131, 132, to the household AC power supply 134 of the structure on which the A/V doorbell 130 is mounted. In the illustrated embodiment, the terminal screws 194 are located within a recessed portion 196 of the rear surface 198 of the back plate 182 so that the terminal screws 194 do not protrude from the outer envelope of the A/V doorbell 130. The A/V doorbell 130 can thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the A/V doorbell 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V doorbell 130 may include a mounting plate or bracket (not shown) to facilitate securing the A/V doorbell 130 to the mounting surface.

Figure 10:
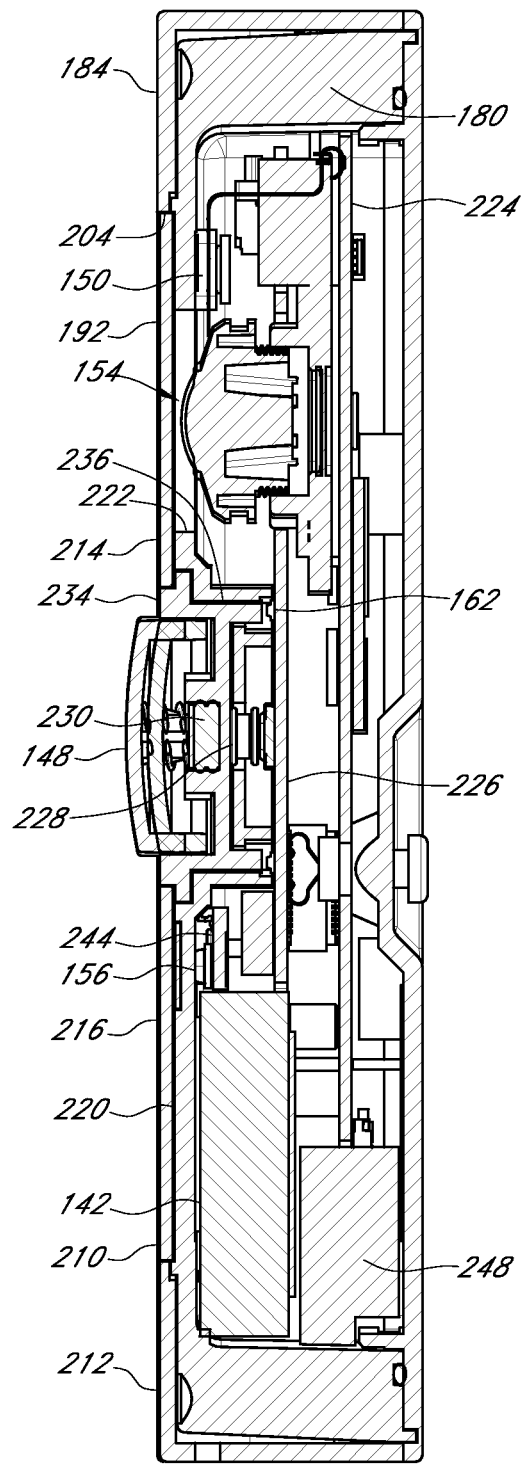
FIG. 10 is a right-side cross-sectional view of the A/V recording and communication doorbell of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V doorbell 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
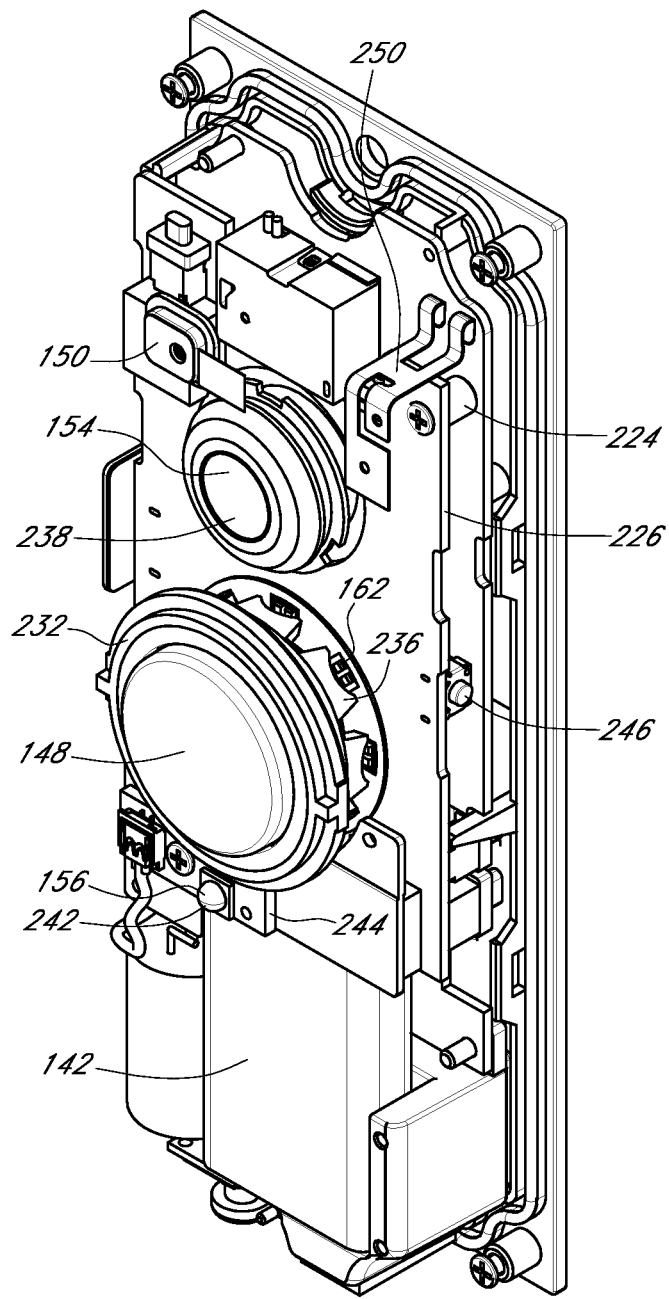
FIGS. 7, 8, and 9 are front perspective views of various internal components of the A/V recording and communication doorbell of FIG. 4.
Figure 8:
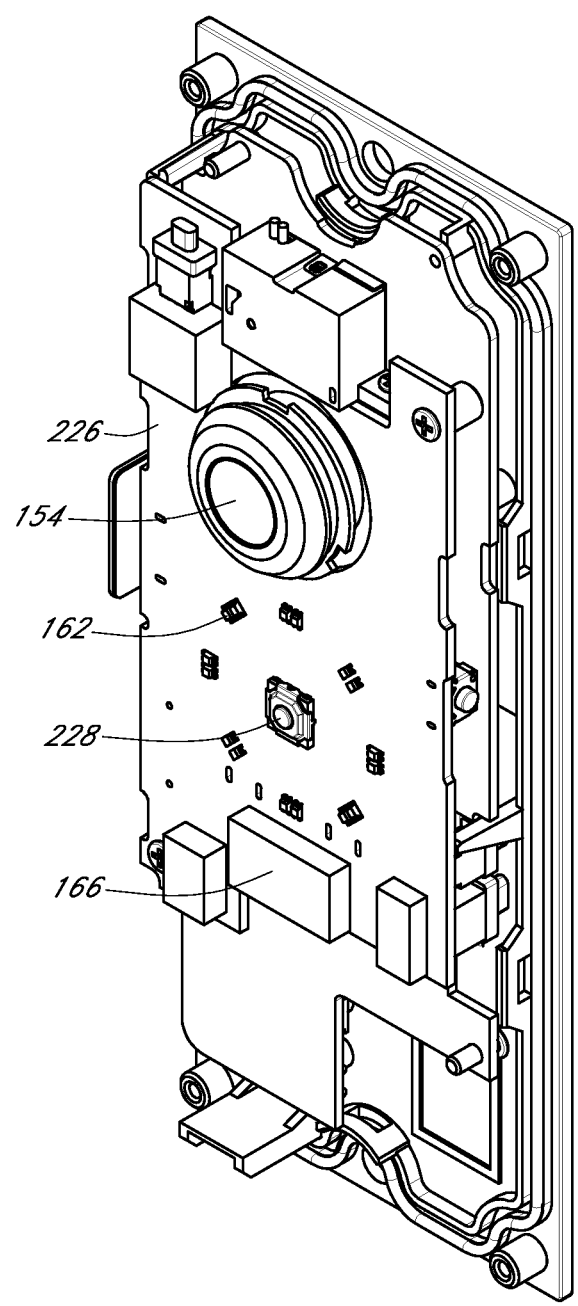
Figure 9:
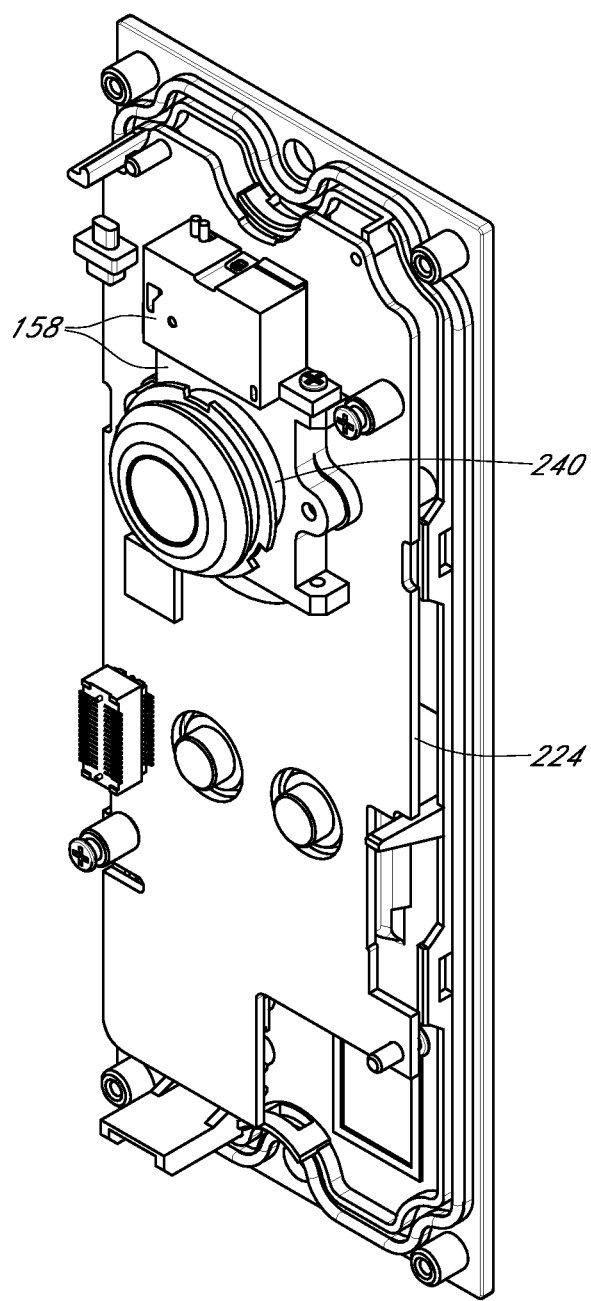

FIGS. 7-10 illustrate various internal components of the A/V doorbell 130. FIGS. 7-9 are front perspective views of the doorbell 130 with the shell 184 and the enclosure 180 removed, while FIG. 10 is a right-side cross-sectional view of the doorbell 130 taken through the line 10-10 in FIG. 4. With reference to FIGS. 7 and 8, the A/V doorbell 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the doorbell 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the doorbell 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless network is good, limited, poor, or not connected. The LEDs 162 may be used to guide the user through setup or installation steps using visual cues, potentially coupled with audio cues emitted from the speaker 152.

With further reference to FIG. 7, the A/V doorbell 130 further comprises a rechargeable battery 142. As described in further detail below, the A/V doorbell 130 is connected to an external power source 134 (FIG. 3), such as AC mains. The A/V doorbell 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V doorbell 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V doorbell 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V doorbell 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V doorbell 130 can clearly capture images at night (may be referred to as "night vision").

With reference to FIG. 9, the A/V doorbell 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some embodiments, the camera 154 acts as a light detector for use in controlling the current state of the IR cut filter 158 and turning the IR LED 242 on and off. Using the camera 154 as a light detector is facilitated in some embodiments by the fact that the A/V doorbell 130 is powered by a connection to AC mains, and the camera 154, therefore, is always powered on. In other embodiments, however, the A/V doorbell 130 may include a light sensor separate from the camera 154 for use in controlling the IR cut filter 158 and the IR LED 242.

With reference back to FIG. 6, the A/V doorbell 130 further comprises a reset button 170. The reset button 170 contacts a reset button actuator 246 (FIG. 8) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160.

Figure 11:
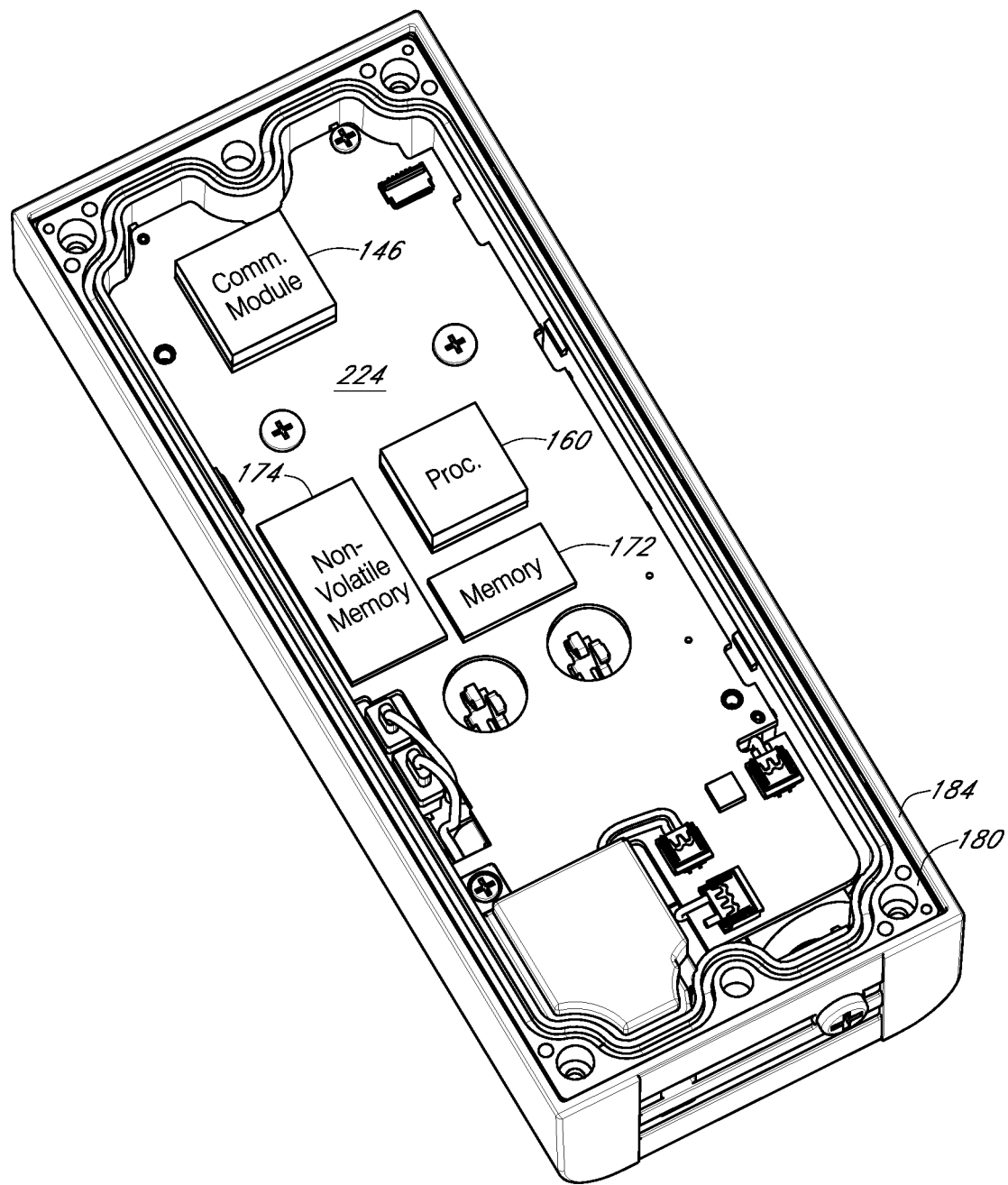
FIGS. 11-13 are rear perspective views of various internal components of the A/V recording and communication doorbell of FIG. 4.
Figure 12:
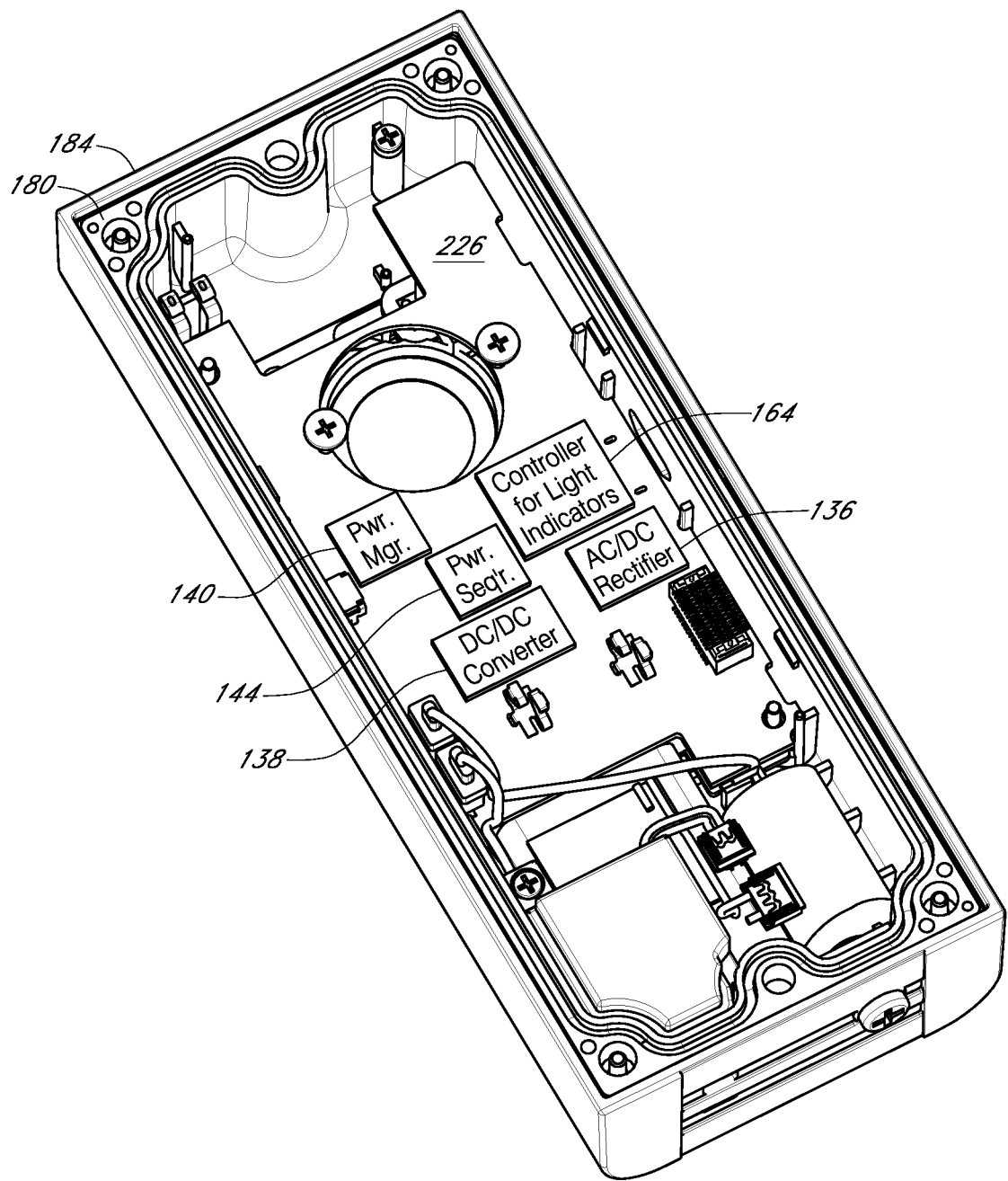
Figure 13:
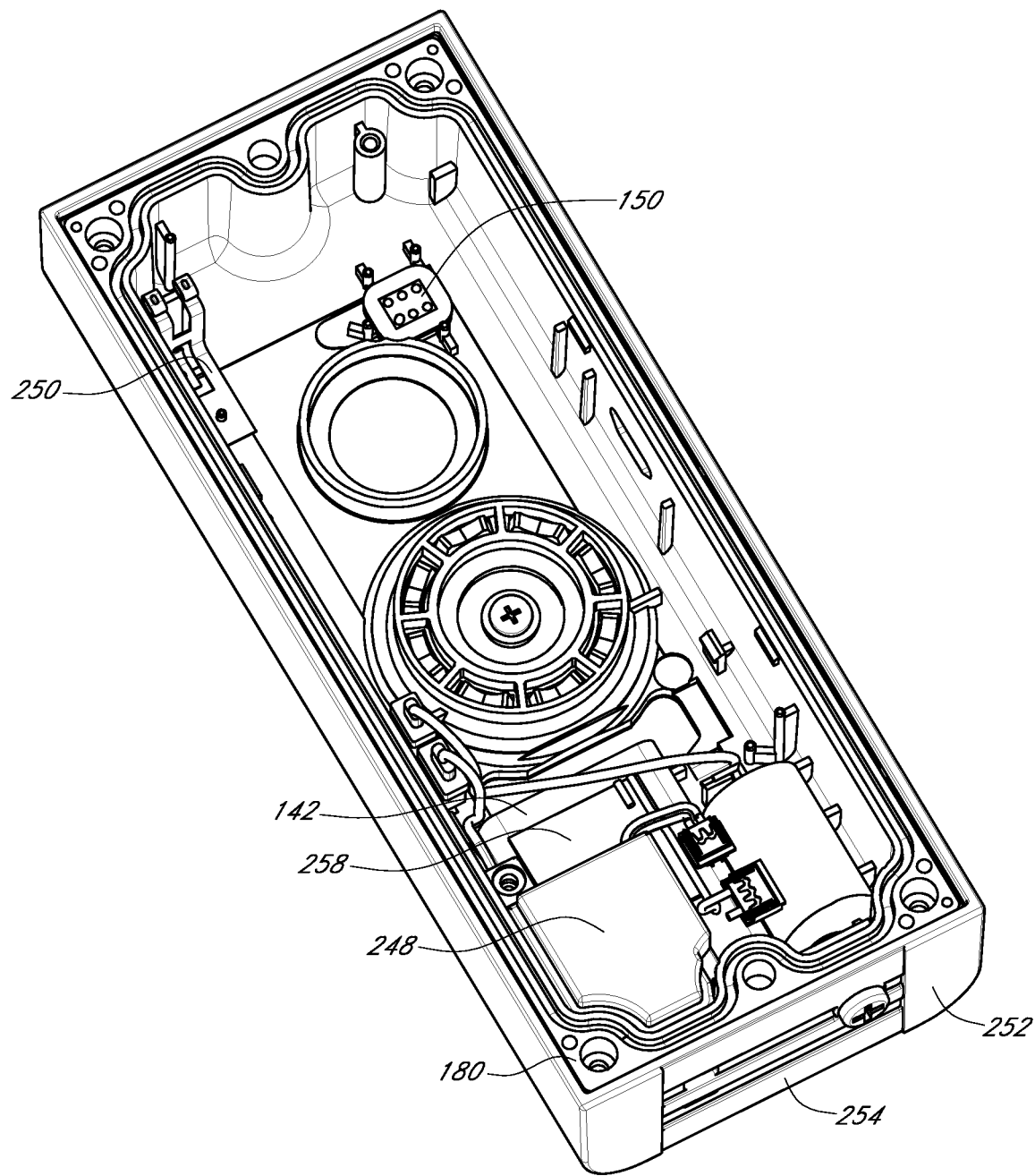

FIGS. 11-13 further illustrate internal components of the A/V doorbell 130. FIGS. 11-13 are rear perspective views of the doorbell 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V doorbell 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V doorbell 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V doorbell 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the doorbell 130 is mounted to a mounting bracket (not shown), the security screw may also maintain the doorbell 130 on the mounting bracket.

With reference to FIG. 13, the A/V doorbell 130 may further include a battery heater 258. The present A/V doorbell 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

As described above, the present embodiments advantageously limit the power consumption of the A/V doorbell to an amount that is below the threshold necessary for causing the signaling device to sound (except when the front button of the doorbell is pressed). The present A/V doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V doorbell can be powered on continuously. In a typical battery-powered A/V doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also because the camera is able to be powered on continuously, it can be used for motion detection, thus eliminating any need for a separate motion detection device, such as a passive infrared sensor (PIR). Eliminating the PIR simplifies the design of the A/V doorbell and enables the doorbell to be made more compact, although in some alternative embodiments the doorbell may include one or more PIRs and/or other motion detectors, heat source detectors, etc. Also because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V doorbell and enabling the doorbell to be made even more compact, although in some alternative embodiments the doorbell may include a separate light detector.

Figure 14:
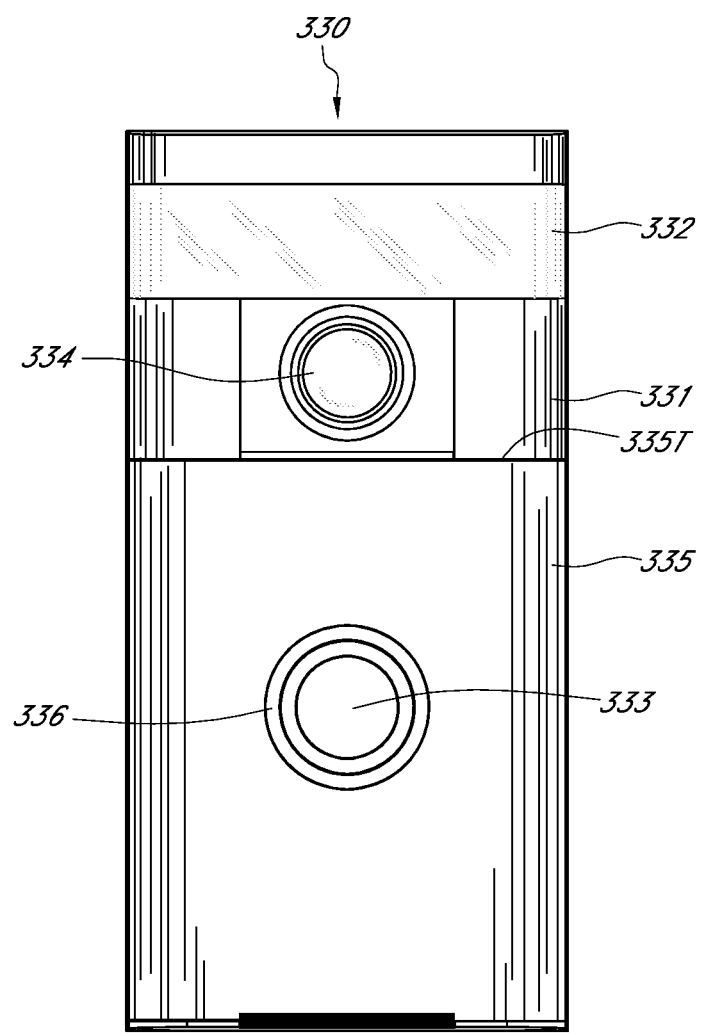
FIG. 14 is a front view of an A/V device according to various aspects of the present disclosure.
Figure 15:
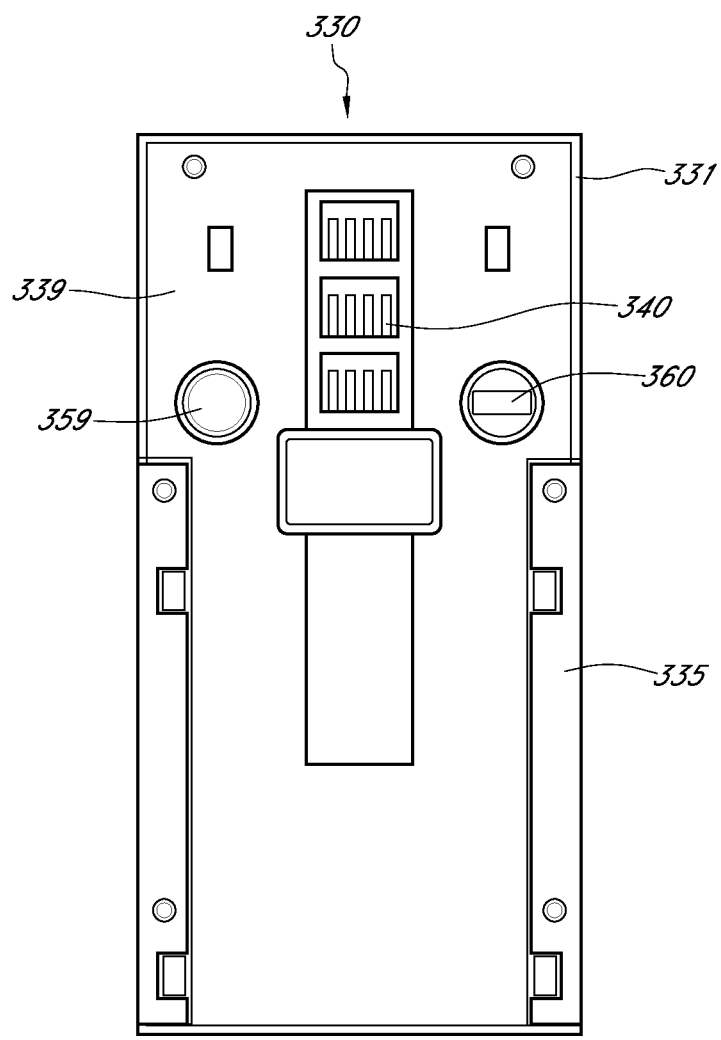
FIG. 15 is a rear view of the A/V device of FIG. 14.
Figure 16:
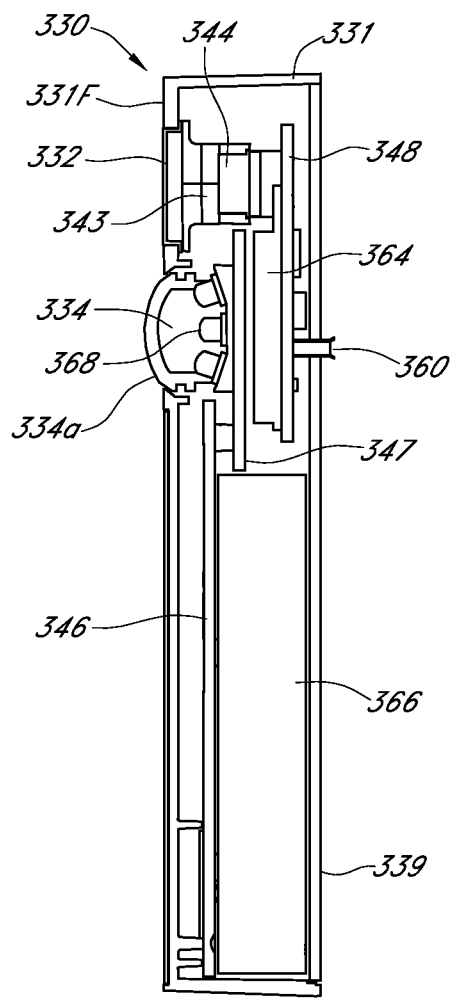
FIG. 16 is right-side cross-sectional view of the A/V device of FIG. 14.
Figure 17:
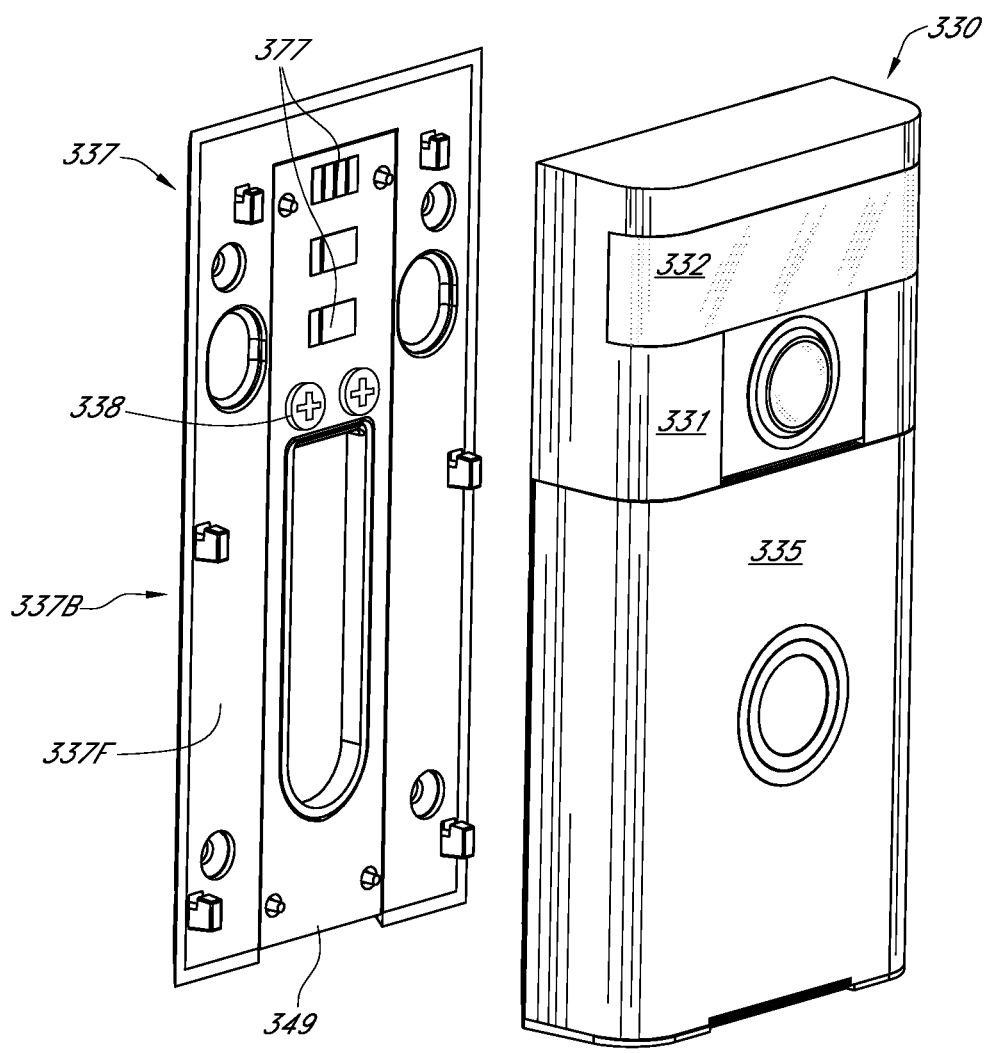
FIG. 17 is an exploded view of the A/V device of FIG. 14 and a mounting bracket.

FIGS. 14-18 illustrate another embodiment of a wireless audio/video (A/V) communication doorbell 330 according to an aspect of present embodiments. FIG. 14 is a front view, FIG. 15 is a rear view, FIG. 16 is a right-side cross-sectional view, and FIG. 17 is an exploded view of the doorbell 330 and a mounting bracket 337. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate 339 (FIG. 15). With reference to FIG. 16, the faceplate 335 has a substantially flat profile. The faceplate 335 may comprise any suitable material, including, without limitation, metals, such as brushed aluminum or stainless steel, metal alloys, or plastics. The faceplate 335 protects the internal contents of the doorbell 330 and serves as an exterior front surface of the doorbell 330.

With reference to FIG. 14, the faceplate 335 includes a button 333 and a light pipe 336. The button 333 and the light pipe 336 may have various profiles that may or may not match the profile of the faceplate 335. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With reference to FIGS. 14 and 15, the doorbell 330 further includes an enclosure 331 that engages the faceplate 335. In the illustrated embodiment, the enclosure 331 abuts an upper edge 335T (FIG. 14) of the faceplate 335, but in alternative embodiments one or more gaps between the enclosure 331 and the faceplate 335 may facilitate the passage of sound and/or light through the doorbell 330. The enclosure 331 may comprise any suitable material, but in some embodiments the material of the enclosure 331 preferably permits infrared light to pass through from inside the doorbell 330 to the environment and vice versa. The doorbell 330 further includes a lens 332. In some embodiments, the lens may comprise a Fresnel lens, which may be patterned to deflect incoming light into one or more infrared sensors located within the doorbell 330. The doorbell 330 further includes a camera 334, which captures video data when activated, as described below.

FIG. 15 is a rear view of the doorbell 330, according to an aspect of the present embodiments. As illustrated, the enclosure 331 may extend from the front of the doorbell 330 around to the back thereof and may fit snugly around a lip of the back plate 339. The back plate 339 may comprise any suitable material, including, without limitation, metals, such as brushed aluminum or stainless steel, metal alloys, or plastics. The back plate 339 protects the internal contents of the doorbell 330 and serves as an exterior rear surface of the doorbell 330. The faceplate 335 may extend from the front of the doorbell 330 and at least partially wrap around the back plate 339, thereby allowing a coupled connection between the faceplate 335 and the back plate 339. The back plate 339 may have indentations in its structure to facilitate the coupling.

With further reference to FIG. 15, spring contacts 340 may provide power to the doorbell 330 when mated with other conductive contacts connected to a power source. The spring contacts 340 may comprise any suitable conductive material, including, without limitation, copper, and may be capable of deflecting when contacted by an inward force, for example the insertion of a mating element. The doorbell 330 further comprises a connector 360, such as a micro-USB or other connector, whereby power and/or data may be supplied to and from the components within the doorbell 330. A reset button 359 may be located on the back plate 339, and may make contact with a button actuator (not shown) located within the doorbell 330 when the reset button 359 is pressed. When the reset button 359 is pressed, it may trigger one or more functions, as described below.

FIG. 16 is a right side cross-sectional view of the doorbell 330 without the mounting bracket 337. In the illustrated embodiment, the lens 332 is substantially coplanar with the front surface 331F of the enclosure 331. In alternative embodiments, the lens 332 may be recessed within the enclosure 331 or may protrude outward from the enclosure 331. The camera 334 is coupled to a camera printed circuit board (PCB) 347, and a lens 334a of the camera 334 protrudes through an opening in the enclosure 331. The camera lens 334a may be a lens capable of focusing light into the camera 334 so that clear images may be taken.

The camera PCB 347 may be secured within the doorbell with any suitable fasteners, such as screws, or interference connections, adhesives, etc. The camera PCB 347 comprises various components that enable the functionality of the camera 334 of the doorbell 330, as described below. Infrared light-emitting components, such as infrared LED's 368, are coupled to the camera PCB 347 and may be triggered to activate when a light sensor detects a low level of ambient light. When activated, the infrared LED's 368 may emit infrared light through the enclosure 331 and/or the camera 334 out into the ambient environment. The camera 334, which may be configured to detect infrared light, may then capture the light emitted by the infrared LED's 368 as it reflects off objects within the camera's 334 field of view, so that the doorbell 330 can clearly capture images at night (may be referred to as "night vision").

With continued reference to FIG. 16, the doorbell 330 further comprises a front PCB 346, which in the illustrated embodiment resides in a lower portion of the doorbell 330 adjacent a battery 366. The front PCB 346 may be secured within the doorbell 330 with any suitable fasteners, such as screws, or interference connections, adhesives, etc. The front PCB 346 comprises various components that enable the functionality of the audio and light components, as further described below. The battery 366 may provide power to the doorbell 330 components while receiving power from the spring contacts 340, thereby engaging in a trickle-charge method of power consumption and supply. Alternatively, the doorbell 330 may draw power directly from the spring contacts 340 while relying on the battery 366 only when the spring contacts 340 are not providing the power necessary for all functions. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360.

With continued reference to FIG. 16, the doorbell 330 further comprises a power PCB 348, which in the illustrated embodiment resides behind the camera PCB 347. The power PCB 348 may be secured within the doorbell 330 with any suitable fasteners, such as screws, or interference connections, adhesives, etc. The power PCB 348 comprises various components that enable the functionality of the power and device-control components, as further described below.

With continued reference to FIG. 16, the doorbell 330 further comprises a communication module 364 coupled to the power PCB 348. The communication module 364 facilitates communication with client devices in one or more remote locations, as further described below. The connector 360 may protrude outward from the power PCB 348 and extend through a hole in the back plate 339. The doorbell 330 further comprises passive infrared (PIR) sensors 344 (also referred to as pyroelectric sensors), which are secured on or within a PIR sensor holder 343, and the assembly resides behind the lens 332. In some embodiments, the doorbell 330 may comprise three PIR sensors 344, as further described below, but in other embodiments any number of PIR sensors 344 may be provided. The PIR sensor holder 343 may be secured to the doorbell 330 with any suitable fasteners, such as screws, or interference connections, adhesives, etc. The PIR sensors 344 may be any type of sensor capable of detecting and communicating the presence of a heat source within their field of view. Further, alternative embodiments may comprise one or more motion sensors either in place of or in addition to the PIR sensors 344. The motion sensors may be configured to detect motion using any methodology, such as a methodology that does not rely on detecting the presence of a heat source within a field of view.

FIG. 17 is an exploded view of the doorbell 330 and the mounting bracket 337 according to an aspect of the present embodiments. The mounting bracket 337 is configured to be mounted to a mounting surface (not shown) of a structure, such as a home or an office. FIG. 17 shows the front side 337F of the mounting bracket 337. The mounting bracket 337 is configured to be mounted to the mounting surface such that the back side 337B thereof faces the mounting surface. In certain embodiments, the mounting bracket 337 may be mounted to surfaces of various composition, including, without limitation, wood, concrete, stucco, brick, vinyl siding, aluminum siding, etc., with any suitable fasteners, such as screws, or interference connections, adhesives, etc. The doorbell 330 may be coupled to the mounting bracket 337 with any suitable fasteners, such as screws, or interference connections, adhesives, etc.

With continued reference to FIG. 17, the illustrated embodiment of the mounting bracket 337 includes the terminal screws 338. The terminal screws 338 are configured to receive electrical wires adjacent the mounting surface of the structure upon which the mounting bracket 337 is mounted, so that the doorbell 330 may receive electrical power from the structure's electrical system. The terminal screws 338 are electrically connected to electrical contacts 377 of the mounting bracket. If power is supplied to the terminal screws 338, then the electrical contacts 377 also receive power through the terminal screws 338. The electrical contacts 377 may comprise any suitable conductive material, including, without limitation, copper, and may protrude slightly from the face of the mounting bracket 337 so that they may mate with the spring contacts 340 located on the back plate 339.

Figure 18:
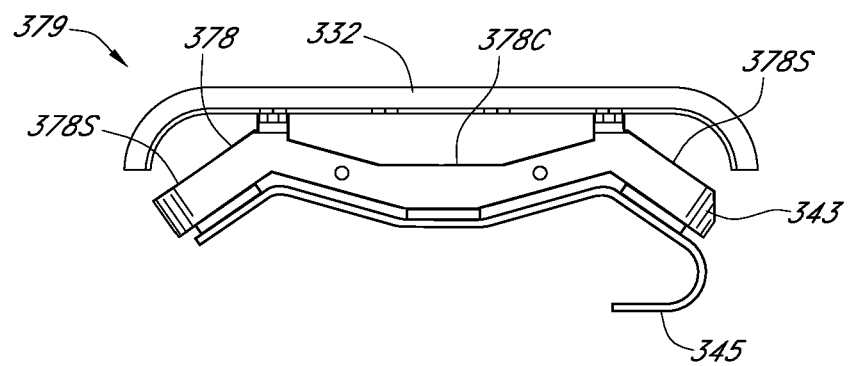
FIG. 18 is a top view of a passive infrared sensor assembly according to various aspects of the present disclosure.

With continued reference to FIG. 17, the mounting bracket 337 further comprises a bracket PCB 349. The bracket PCB 349 is situated outside the doorbell 330, and is therefore configured for various sensors that measure ambient conditions, such as an accelerometer 350, a barometer 351, a humidity sensor 352, and a temperature sensor 353 (FIG. 18). The functions of these components are discussed in more detail below. The bracket PCB 349 may be secured to the mounting bracket 337 with any suitable fasteners, such as screws, or interference connections, adhesives, etc.

With continued reference to FIG. 17, the faceplate 335 may extend from the bottom of the doorbell 330 up to just below the camera 334, and connect to the back plate 339 as described above. The lens 332 may extend and curl partially around the side of the doorbell 330. The enclosure 331 may extend and curl around the side and top of the doorbell 330, and may be coupled to the back plate 339 as described above. The camera 334 may protrude slightly through the enclosure 331, thereby giving it a wider field of view. The mounting bracket 337 may couple with the back plate 339 such that they contact each other at various points in a common plane of contact, thereby creating an assembly including the doorbell 330 and the mounting bracket 337.

The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 19:
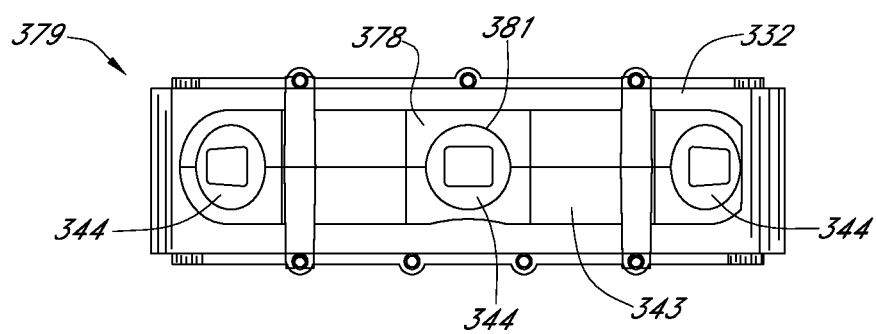
FIG. 19 is a front view of the passive infrared sensor assembly of FIG. 18.

FIG. 18 is a top view and FIG. 19 is a front view of a passive infrared sensor assembly 379 including the lens 332, the passive infrared sensor holder 343, the passive infrared sensors 344, and a flexible power circuit 345. The passive infrared sensor holder 343 is configured to mount the passive infrared sensors 344 facing out through the lens 332 at varying angles, thereby allowing the passive infrared sensor 344 field of view to be expanded to 180° or more and also broken up into various zones, as further described below. The passive infrared sensor holder 343 may include one or more faces 378, including a center face 378C and two side faces 378S to either side of the center face 378C. With reference to FIG. 19, each of the faces 378 defines an opening 381 within or on which the passive infrared sensors 344 may be mounted. In alternative embodiments, the faces 378 may not include openings 381, but may instead comprise solid flat faces upon which the passive infrared sensors 344 may be mounted. Generally, the faces 378 may be any physical structure capable of housing and/or securing the passive infrared sensors 344 in place.

With reference to FIG. 18, the passive infrared sensor holder 343 may be secured to the rear face of the lens 332. The flexible power circuit 345 may be any material or component capable of delivering power and/or data to and from the passive infrared sensors 344, and may be contoured to conform to the non-linear shape of the passive infrared sensor holder 343. The flexible power circuit 345 may connect to, draw power from, and/or transmit data to and from, the power printed circuit board 348.

Figure 20:
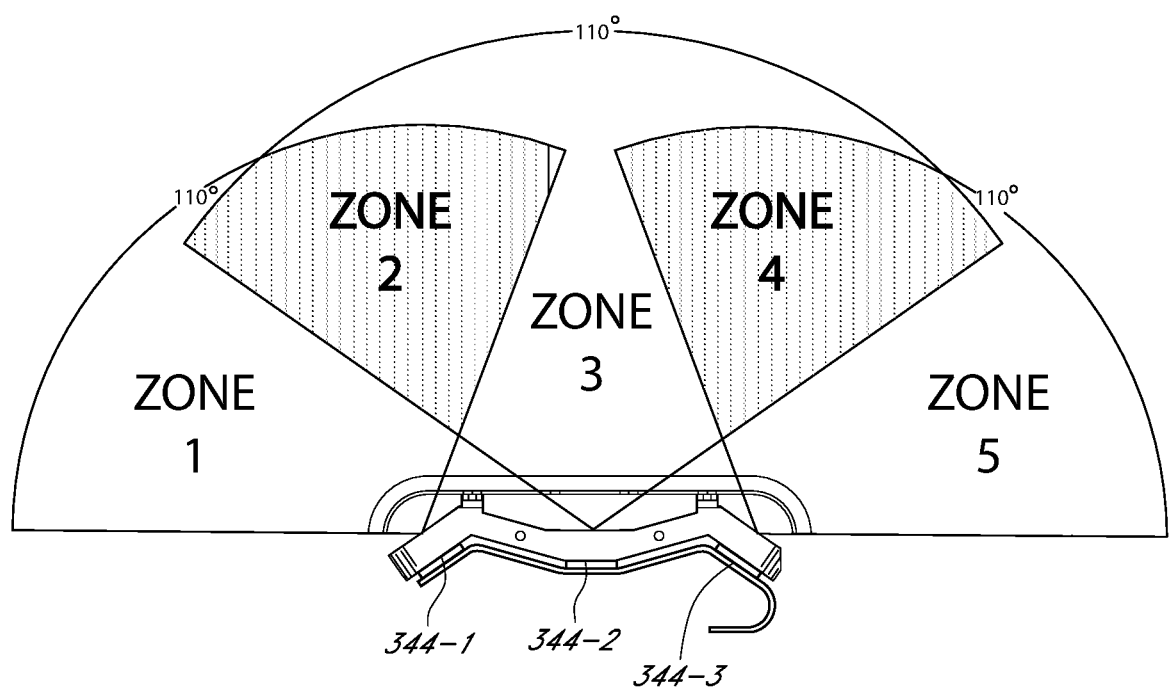
FIG. 20 is a top view of the passive infrared sensor assembly of FIG. 18, illustrating the fields of view of the passive infrared sensors according to various aspects of the present disclosure.

FIG. 20 is a top view of the passive infrared sensor assembly 379 illustrating the fields of view of the passive infrared sensors 344. In the illustrated embodiment, the side faces 378S of the passive infrared sensor holder 343 are angled at 55° facing outward from the center face 378C, and each passive infrared sensor 344 has a field of view of 110°. However, these angles may be increased or decreased as desired. Zone 1 is the area that is visible only to a first one of the passive infrared sensors 344-1. Zone 2 is the area that is visible only to the first passive infrared sensor 344-1 and a second one of the passive infrared sensors 344-2. Zone 3 is the area that is visible only to the second passive infrared sensor 344-2. Zone 4 is the area that is visible only to the second passive infrared sensor 344-2 and a third one of the passive infrared sensors 344-3. Zone 5 is the area that is visible only to the third passive infrared sensor 344-3. In some embodiments, the doorbell 130 may be capable of determining the direction that an object is moving based upon which zones are triggered in a time sequence.

Figure 21:
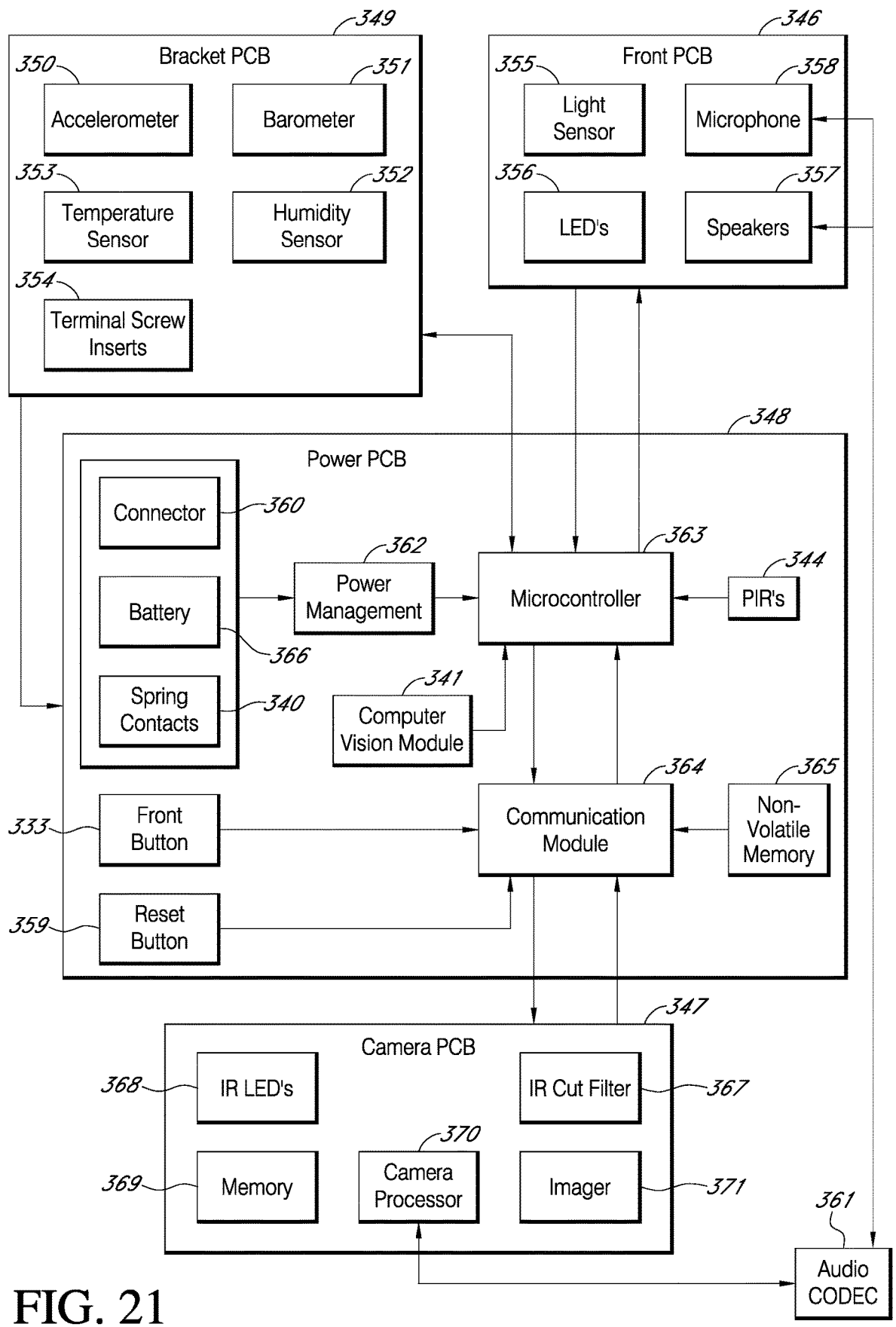
FIG. 21 is a functional block diagram of the components of the A/V device of FIG. 14.

FIG. 21 is a functional block diagram of the components within or in communication with the doorbell 330, according to an aspect of the present embodiments. As described above, the bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. As described above, the bracket PCB 349 may be located outside the housing of the doorbell 330 so as to reduce interference from heat, pressure, moisture, and/or other stimuli generated by the internal components of the doorbell 330.

With further reference to FIG. 21, the bracket PCB 349 may further comprise terminal screw inserts 354, which may be configured to receive the terminal screws 338 and transmit power to the electrical contacts 377 on the mounting bracket 337 (FIG. 17). The bracket PCB 349 may be electrically and/or mechanically coupled to the power PCB 348 through the terminal screws 338, the terminal screw inserts 354, the spring contacts 340, and the electrical contacts 377. The terminal screws 338 may receive electrical wires located at the surface to which the doorbell 330 is mounted, such as the wall of a building, so that the doorbell can receive electrical power from the building's electrical system. Upon the terminal screws 338 being secured within the terminal screw inserts 354, power may be transferred to the bracket PCB 349, and to all of the components associated therewith, including the electrical contacts 377. The electrical contacts 377 may transfer electrical power to the power PCB 348 by mating with the spring contacts 340.

With further reference to FIG. 21, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electro-mechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 14). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114. When the user speaks, after being transferred through the network 112, digital audio data is decompressed by audio CODEC 361 and emitted to the visitor via the speakers 357.

With further reference to FIG. 21, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 21, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 21, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 21, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

Some of the present embodiments comprise computer vision for one or more aspects, such as object recognition. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present A/V device 130 may include a computer vision module 163. The computer vision module 163 may include any of the components (e.g. hardware) and/or functionality described herein with respect to computer vision, including, without limitation, one or more cameras, sensors, and/or processors. In some embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 163, and/or the camera 154 and/or the processor 160 may receive information about the person using any one, or any combination of more than one, of the foregoing biometrics. The A/V device of FIG. 3 is shown as including the computer vision module 163; however the location and connectivity of this module is not intended to be limiting. Similarly, the A/V device of the embodiment of FIG. 21 may also include a computer vision module 341.

One aspect of the present embodiments includes the realization that audio/video recording and communication devices ("A/V devices"), other than those described herein, sometimes suffer from issues with respect to motion sensing accuracy versus power consumption. For example, motion sensing is often accomplished by using one or more passive infrared (PIR) sensors. PIR sensors generally sense motion by sensing changes in the amount of infrared radiation received by the PIR sensor. For example, when a person moves into the field of view (FOV) of a PIR sensor, the PIR sensor detects a change in the amount of infrared radiation that it is receiving, creating a voltage change at the output of the PIR sensor, which is interpreted by a processor receiving the voltage signal as indicating that motion has been sensed by the PIR sensor. PIR sensors have the advantage that they generally consume low amounts of power compared to other motion sensor devices and techniques. PIR sensors also have the advantage that they do not require the presence or use of other devices to generate radiation to be received, thereby contributing to their ease of use. Further, PIR sensors have the advantage that they can detect motion within a predetermined area or field of view and are not limited to a single line or point in space.

That said, PIR sensors have disadvantages. For example, PIR sensors sometimes generate false positives from motion that may be considered unimportant. For example, these devices may sense motion of animals, swaying tree branches, and other motion that is not related to a person coming into the field of view of the camera, and may therefore cause a camera to record image data of these unimportant events. Likewise, prior art efforts to prevent such false positives can sometimes result in failures to record motion caused by a person, which motion is more likely to be important and should therefore be recorded by the camera of the A/V device. Further, sometimes direct sunlight on a PIR sensor can cause such false positives and/or failures to record. Moreover, glare from a car window, a building window, a glass door that regularly opens and closes, etc., can cause false positives and/or failures to trigger a motion alert depending upon the particular design and configuration of the PIR sensor. These false positives and failures to record are often exacerbated by varying light conditions, ranging from full daylight, to dawn/dusk, to full night.

Motion sensing is also sometimes accomplished using active infrared (AIR) sensors. AIR sensors are generally configured to emit radiation, such as infrared radiation, and then measure either the presence or absence of the emitted infrared radiation at a receiver. AIR sensors are also sometimes referred to as "photoelectric sensors." They may include various types of sensors, including "through-beam" sensors, "retro-reflective" sensors, and "diffuse-reflective" sensors. For example, a through-beam sensor transmits a beam of light from a transmitter to a separately positioned receiver. If a person or object blocks or breaks the beam of light, the sensor detects this and converts it to an electrical output indicating that motion has been detected. A retro-reflective sensor functions in a similar manner, except that the transmitter and the receiver are in the same unit. The transmitter transmits a beam of light to a separately positioned reflector, and the beam of light is reflected back to the receiver. If the beam of light is interrupted, the sensor is triggered. A diffuse-reflective sensor operates in a somewhat different manner. The diffuse-reflective sensor has a transmitter and receiver in a single unit, and transmits a beam of light at a particular wavelength, but there is no separately positioned receiver or reflector. Instead, if the beam of light is reflected to some degree, e.g., a diffuse reflection, by an object, some of the radiation of that diffuse reflection will be the reflected back to the receiver. If sufficient radiation on the particular wavelength is received by the receiver, the sensor detects this and converts it to an electrical output indicating that the beam has been interrupted and motion has been detected. Further, while these devices are referred to herein generally as active infrared sensors, it should be understood that such sensors may use radiation that is in the visible spectrum, such as a red light, a red laser, a green light or a blue light. AIR sensors have the advantage that they are generally more accurate at sensing motion (or the presence of a person or object in the beam of the device) than PIR sensors. However, AIR sensors consume significantly more power than PIR sensors. Additionally, AIR sensors are limited in the area that they can cover, as they sense motion by the interruption or reflection of a beam of light and can therefore only sense motion along the path of the beam of light.

Motion sensing is also sometimes accomplished using computer vision analysis of video taken by a video camera. While many variations of techniques and algorithms to do so exist, they generally use electronic circuitry and executable instructions to compare video images taken over a certain time span to determine if the image has changed, and if it has, to determine if the change to the image shows a person or object entering the field of view of the video camera. Motion sensing by computer vision analysis of video images has the advantage that it is frequently very accurate in determining that motion has occurred and correctly assessing the source of the motion. However, it has the disadvantages of being relatively slower than either PIR sensors or AIR sensors. Further, it has the disadvantage of consuming relatively larger amounts of power than either PIR sensors or AIR sensors. Finally, it also typically requires more and larger physical components to sense motion than a PIR sensor or an AIR sensor, e.g., both a video camera and a processor running the executable computer vision analysis instructions.

Motion sensing is also sometimes accomplished using computer vision analysis of real-time images. For example, Qualcomm Technologies, Inc. of San Diego, Calif. has developed a small, integrated, low-power computer vision module (ILP-CVM), offered commercially as the "Glance," which can be integrated into a wide variety of battery-powered and line-powered devices, to perform object detection, feature recognition, and change/motion detection. The ILP-CVM includes a lens for focusing an image, a complementary metal-oxide semiconductor (CMOS) image sensor onto which the image is focused, and a digital processor engine that performs embedded image processing within the module and outputs post-processed metadata about the image, rather than raw image data. It provides a number of advantages in that it has lower power consumption than other computer vision analysis solutions discussed above, and may be faster than such other computer vision analysis solutions. The ILP-CVM, however, has the disadvantages that it still typically consumes more power than PIR sensors and is significantly more expensive than PIR sensors or AIR sensors.

One aspect of the present embodiments includes the realization that each of the above-described motion sensing devices has advantages over the other devices, but also disadvantages when compared to the other devices, thus resulting in tradeoffs when one of these devices is selected for a given application. The present embodiments solve this problem by combining the functionalities of these devices in novel combinations to provide numerous advantages. Example advantages of the present embodiments include, without limitation, improved accuracy for motion sensing, and improved accuracy for determining that the source of motion is a person or other potentially threatening source, rather than a non-threatening animal (such as a squirrel or a bird) or environmentally-caused motion (such as tree branches moving in the wind), while at the same time reducing and controlling the amount of power consumption that would otherwise occur when these above-described motion sensing devices are used independently.

Figure 22:
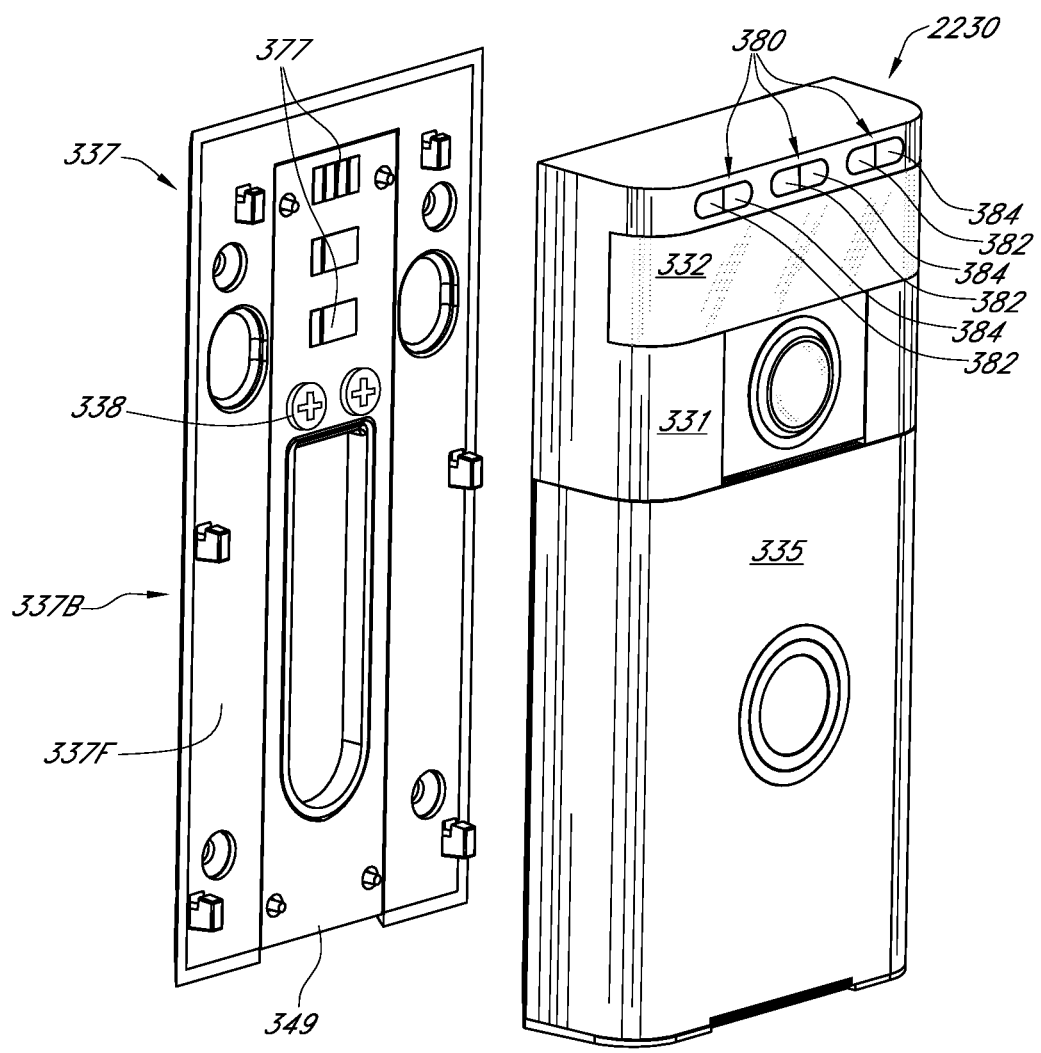
FIG. 22 is an exploded view of another embodiment of the A/V device of FIG. 14 and a mounting bracket.
Figure 23:
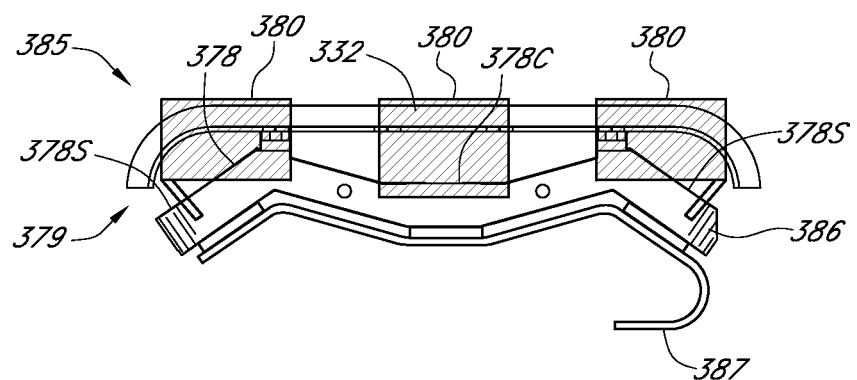
FIG. 23 is a top view of a passive infrared sensor assembly, with an active infrared sensor assembly, according to various aspects of the present disclosure.
Figure 24:
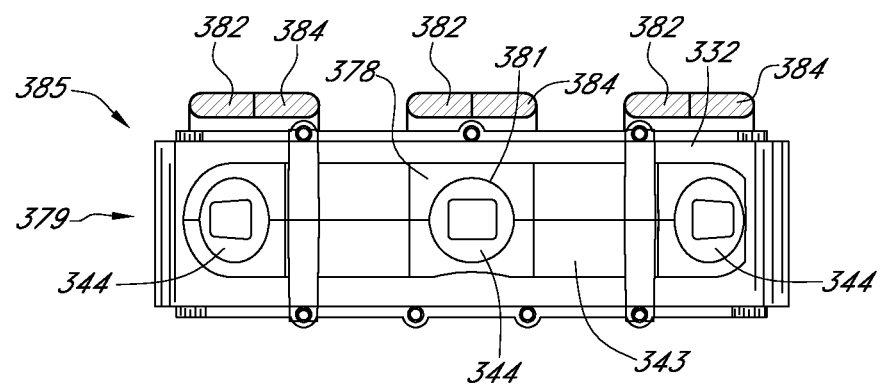
FIG. 24 is a is a front view of the passive infrared sensor assembly, with the active infrared sensor assembly, of FIG. 23.

FIGS. 23-24 illustrate an embodiment of an audio/video recording and communication device ("A/V device") 2230 according to aspects of the present disclosure. The A/V device 2230 is similar to the A/V device 330 discussed above. However, as shown in FIG. 22, the A/V device 2230 includes a plurality of active infrared (AIR) sensors 380. Each of the AIR sensors 380 has an AIR transmitter 382 and a respective AIR receiver 384. Each of the AIR sensors 380 also has a respective AIR sensor field of view (not shown). In some embodiments, at least a portion of the respective AIR sensor fields of view overlap at least a portion of the PIR sensor field(s) of view.

With reference to FIGS. 23-24, each AIR sensor 380 is mounted on an active infrared sensor assembly 385, which is coupled to the passive infrared sensor assembly 379. The active infrared assembly 385 includes the AIR transmitters 382 and the AIR receivers 384, the AIR/PIR sensor holder 386, and a flexible power circuit 387. In the illustrated embodiment, the AIR transmitters 382 and AIR receivers 384 project forwardly from the AIR sensor holder 386 and project slightly through, or are flush with, the enclosure 331, as shown in FIG. 22.

In some embodiments, such as the one shown in FIGS. 23-24, three AIR sensors 380 are used, but either more, or less, may be used to achieve the desired field of view and/or sensitivity to motion. Other configurations are also possible. For example, in a further embodiment, at least one PIR sensor 344 is a wide-angle PIR sensor having a wide-angle PIR sensor field of view, and each of the AIR sensors 380 is a narrow-angle AIR sensor having a narrow-angle AIR sensor field of view. For example, the PIR sensor field of view may be at least 90 degrees horizontally, at least 180 degrees horizontally, or at least 270 degrees horizontally. Likewise, each of the respective AIR sensor fields of view may be less than 90 degrees horizontally, less than 60 degrees horizontally, or less than 30 degrees horizontally.

Figure 25:
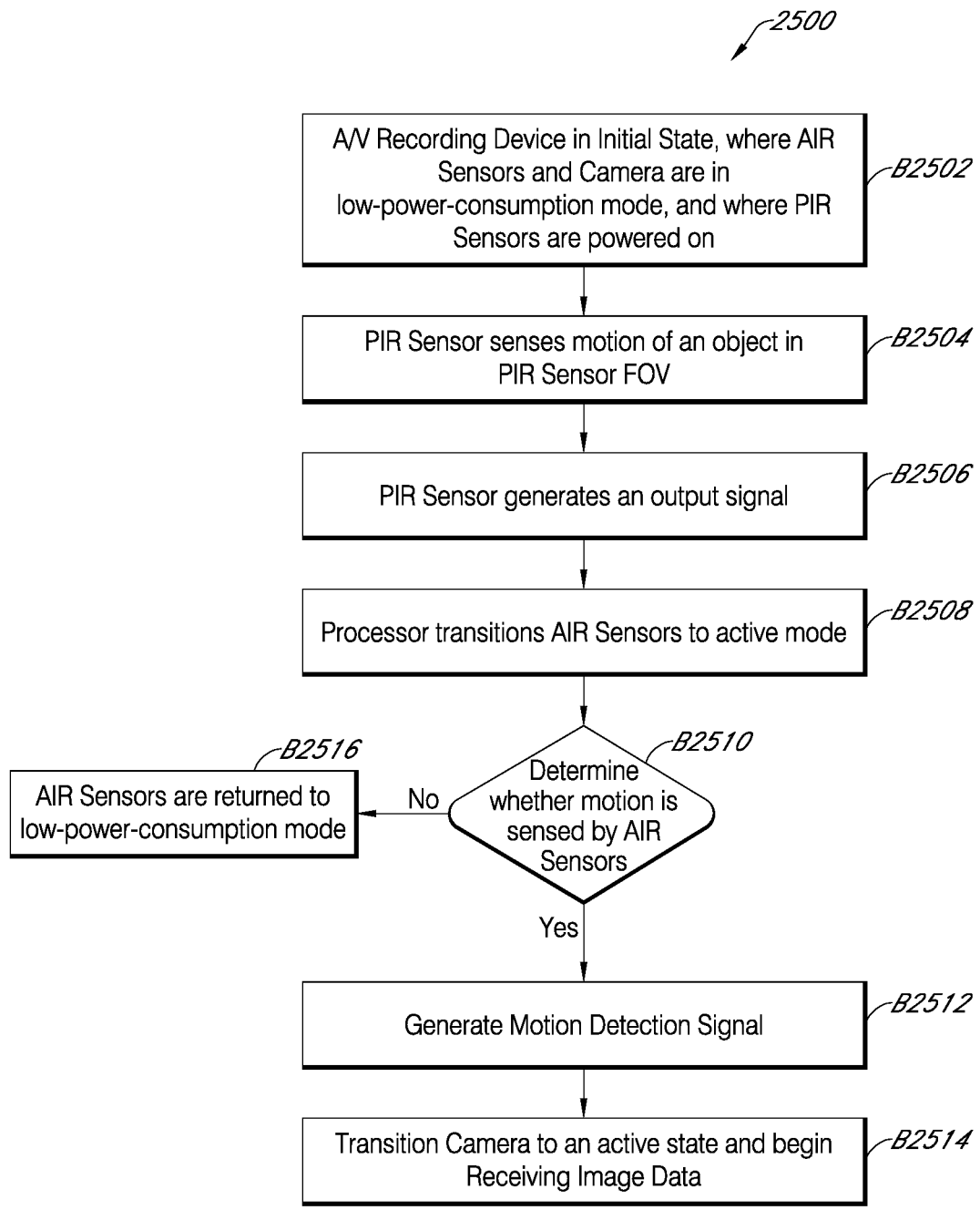
FIG. 25 is a flowchart illustrating one embodiment of a process for sensing motion and controlling power consumption for an A/V device according to various aspects of the present disclosure.

FIG. 25 is a flowchart for an example method of operation 2500 of an A/V device 2230 having both PIR sensors 344 and AIR sensors 380 according to aspects of the present disclosure. At block B2502, the A/V device is in an initial state, where the AIR sensors 380 are in a low-power-consumption mode and the camera 104 is in a low-power-consumption mode. In this low-power-consumption mode, the AIR sensors 380 and/or the camera 104 may be completely powered off, or they may be in some form of low power "sleep" mode. In some embodiments, the processor 363 may also be in a low-power-consumption state. In this initial state, the PIR sensors 344 are powered on and configured for sensing changes in infrared radiation in their PIR fields of view, which might indicate motion by an object, such as a person. At block B2504, the PIR sensor 344 senses motion of an object in the PIR sensor field of view. At block B2506, in response to the sensing of the motion of an object in the PIR sensor field of view, the PIR sensor generates a PIR sensor output signal. At block B2508, the processor receives the PIR sensor output signal and, in response, the processor 363 transitions the AIR sensors 380 to an active mode in which the AIR sensors 380 are configured to sense infrared radiation in their respective AIR sensor fields of view. At block B2510, the AIR sensors, either alone or in conjunction with the processor, determine whether the motion of an object is sensed by at least one of the AIR sensors. At block B2512, if motion has been sensed by at least one of the AIR sensors, the AIR sensors, either alone or in conjunction with the processor, generate a motion detection signal. At block B2514, this motion detection signal causes the camera 334, or alternatively, the camera 334 and the processor 363 to transition to an active state, to begin receiving and processing image data of the source of the motion. Alternatively, at block B2516, if motion has not been sensed by at least one of the AIR sensors, the AIR sensors are returned to a low-power-consumption mode.

Figure 26:
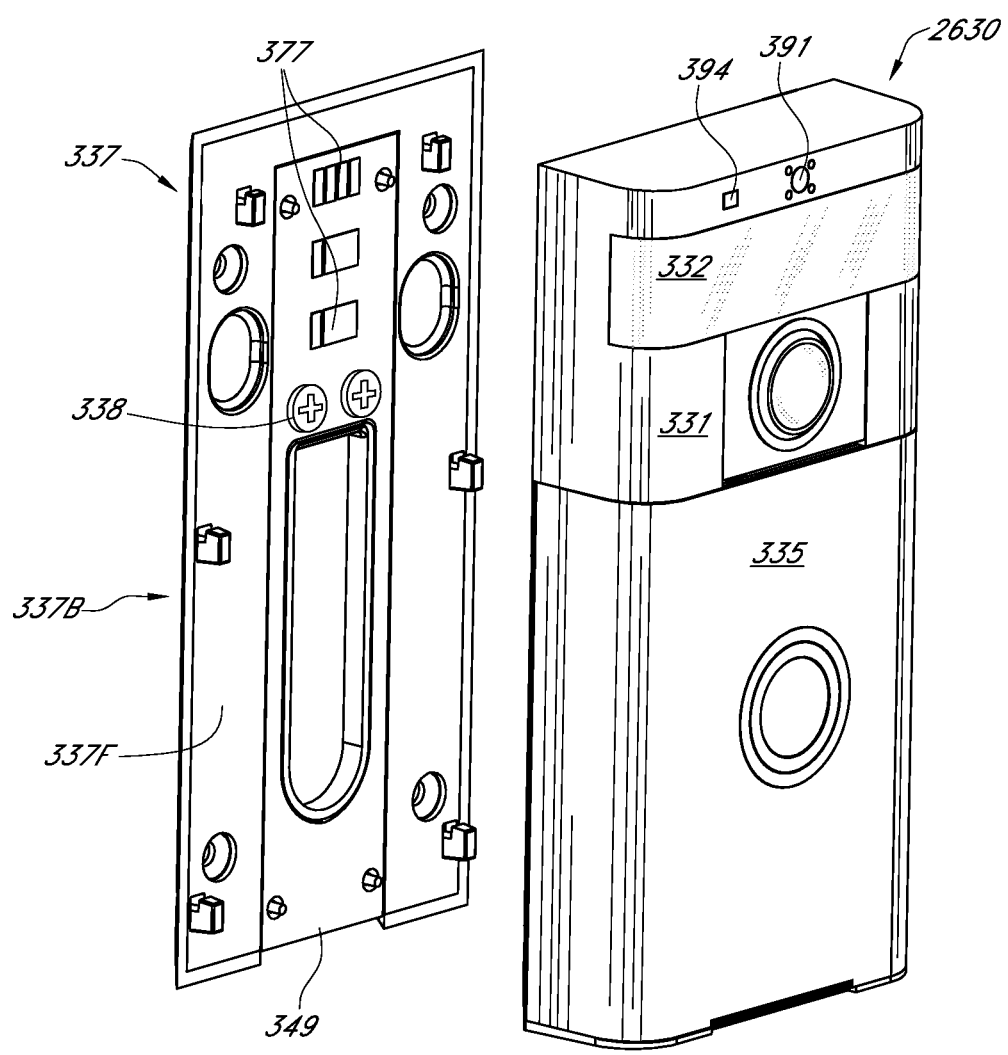
FIG. 26 is an exploded view of another embodiment of the A/V device of FIG. 14 and a mounting bracket.
Figure 27:
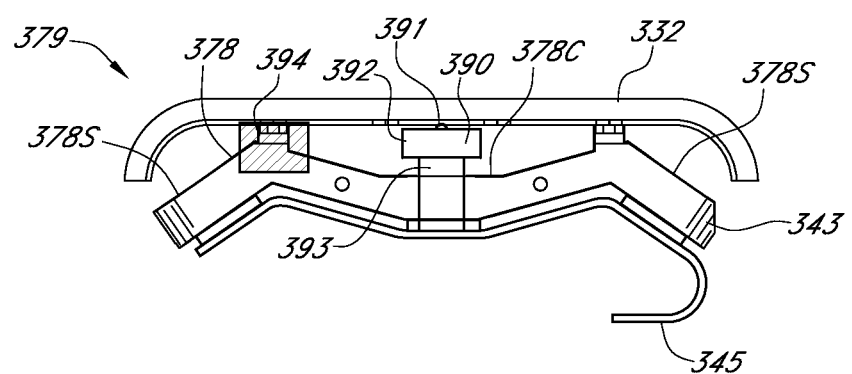
FIG. 27 is a top view of a passive infrared sensor assembly, with an integrated low-power computer vision module and an infrared emitting device, according to various aspects of the present disclosure.
Figure 28:
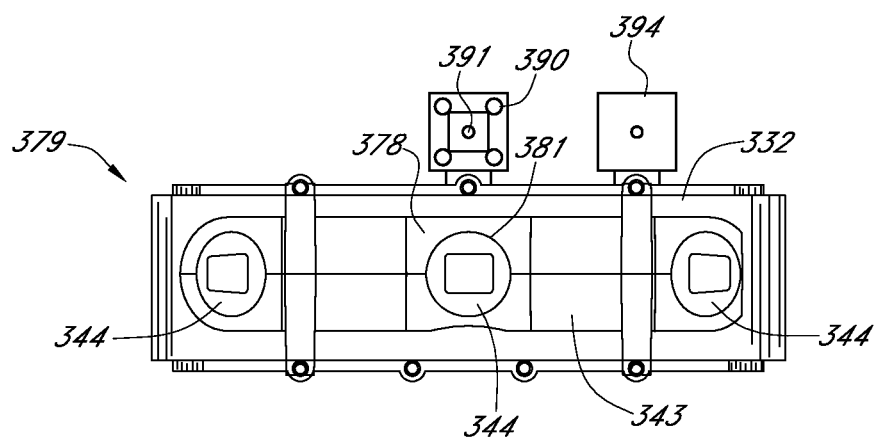
FIG. 28 is a is a front view of the passive infrared sensor assembly, with the integrated low power computer vision module and an infrared emitting device, of FIG. 27.

FIGS. 26-28 illustrate another embodiment of an audio/video recording and communication device ("A/V device") 2630 according to aspects of the present disclosure. The A/V device 2630 is similar to the embodiments of the A/V devices 330, 2230 discussed above. However, with reference to FIGS. 27 and 28, the A/V device 2630 includes an integrated low-power computer vision module (ILP-CVM) 390 comprising a lens 391, an image sensor 392 with an image sensor field of view (not shown), and a digital processor engine 393. In the illustrated embodiment, the ILP-CVM 390 is coupled to the passive infrared sensor assembly 379, but in other embodiments the ILP-CVM 390 may be coupled to one or more other components of the A/V device 2630.

The image sensor 392 may be a complementary metal-oxide semiconductor (CMOS) sensor, but could also be any other suitable image sensor. In some embodiments, when the image sensor 392 is powered on, it may consume less than two milliwatts of power. The lens 391, which may be substantially flush with, project slightly through, or be recessed within, the enclosure 331 as shown in FIG. 26, focuses light onto the image sensor 392. The image sensor 392 is operatively connected to the digital processor engine 393, which includes circuitry and executable instructions for computer vision processing. In some embodiments, at least a portion of the camera FOV overlaps at least a portion of the image sensor FOV. The digital processor engine 393 is operatively coupled to the main processor 363 of the A/V device 2630, such as through a serial peripheral interface (SPI) bus (not shown). With reference to FIGS. 27 and 28, an infrared emitter 394, such as an IR LED, may be included to provide "night vision" capability as discussed herein. In some embodiments, the A/V device 2630 may omit the PIR sensors 344 entirely and include only the ILP-CVM 390.

Figure 29:
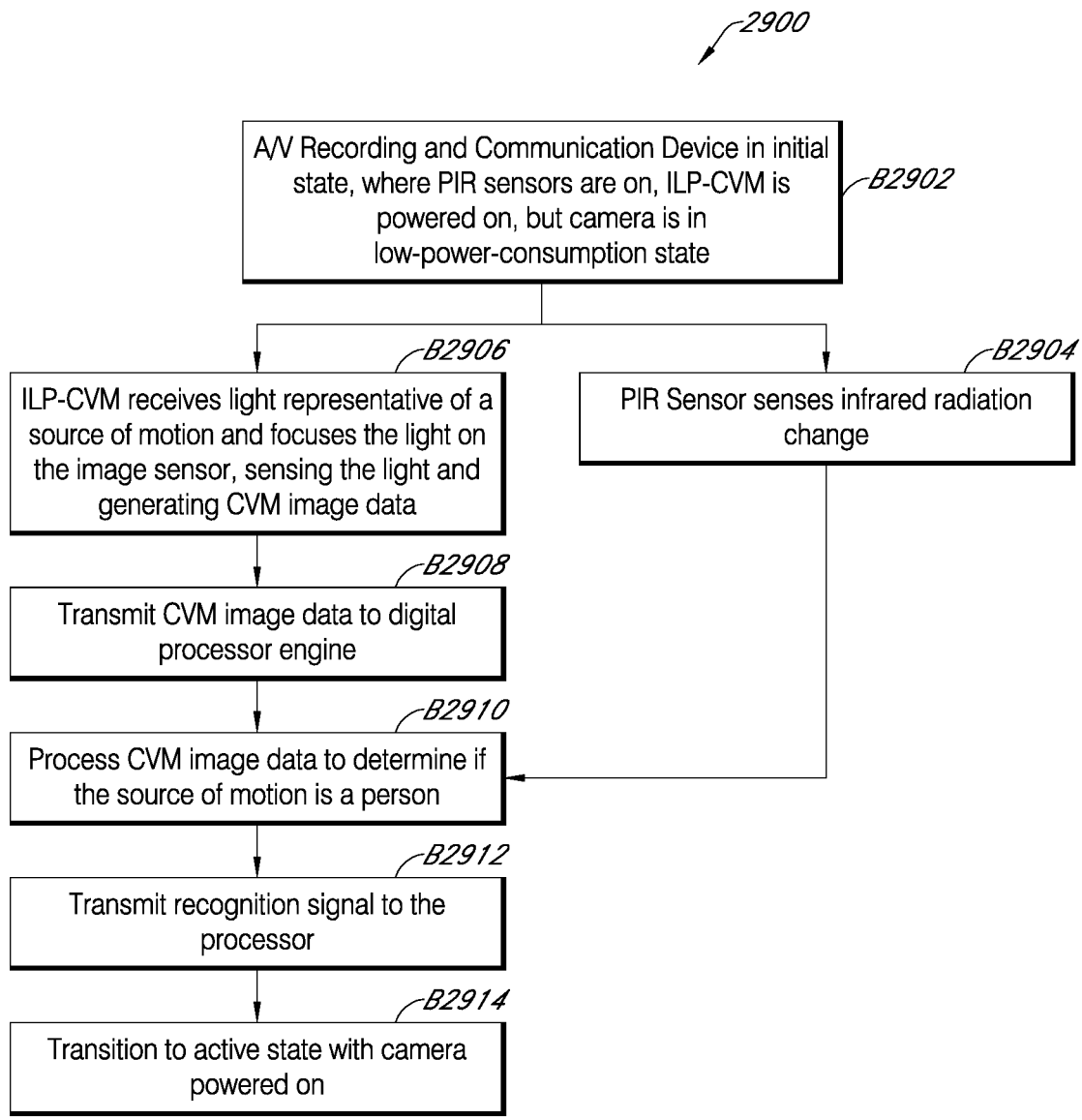
FIG. 29 is a flowchart illustrating one embodiment of a process for sensing motion and controlling power consumption for an A/V device according to various aspects of the present disclosure.

FIG. 29 is a flowchart for an example method of operation 2900 of an A/V device 2630 having both PIR sensors 344 and an ILP-CVM 390 according to aspects of the present disclosure. At block B2902, the A/V device 2630 is in an initial state, where the PIR sensors 344 are powered on, the ILP-CVM 390 is powered on, but the camera 334 is in a low-power-consumption state. In this low-power-consumption mode, the camera 334 may be completely powered off, or it may be in some form of low power "sleep" mode. In some embodiments, the processor 363 may also be in a low-power-consumption state. In this initial state, the PIR sensors 344 are powered on and are configured for sensing changes in infrared radiation in their PIR fields of view, which might indicate motion by a person or object. At block B2904, the PIR sensors 344 sense a change in infrared radiation, which might indicate motion by a person or object. At approximately the same time, at block B2906, the ILP-CVM 390 receives light representative of a source of motion that is in the image sensor FOV, through the lens 391, and focuses the light representative of the source of motion on the image sensor 392, sensing the light on the image sensor 392 to generate CVM image data. At block B2908, the CVM image data is transmitted to the digital processor engine 393. At block B2910, the digital processor engine 393 of the ILP-CVM 390 processes the CVM image data to determine if the source of motion is a person. In some embodiments, this processing may be performed by the processor 363, and may include assessing the PIR sensor 344 signals—either indicating motion or not indicating motion—generated at block B2904, as a check upon or a component of the decision-making process to evaluate whether potentially threatening motion, e.g. a person, has been sensed.

At block B2912, upon determining that the source of motion is a person, the digital processor engine 393 of the ILP-CVM 390 transmits a recognition signal to the processor 363. At block B2914, upon receiving the recognition signal at the processor 363, the processor causes the A/V device to transition to an active mode in which the camera 334 is powered on, and receives camera image data that is representative of the person in the camera FOV. In some embodiments of this process, the processor 363 evaluates signals from both the PIR sensor 344 and the ILP-CVM 390 to determine if motion is sensed. In other embodiments, the processor 363 may determine that motion has been sensed based upon the input of either of the PIR sensor 344 or the ILP-CVM 390. The decision of how and whether to evaluate the signals of both the PIR sensor 344 and the ILP-CVM 390 may be based on a variety of environmental factors, such as the time of day, ambient light conditions, and/or user preferences.

Figure 30:
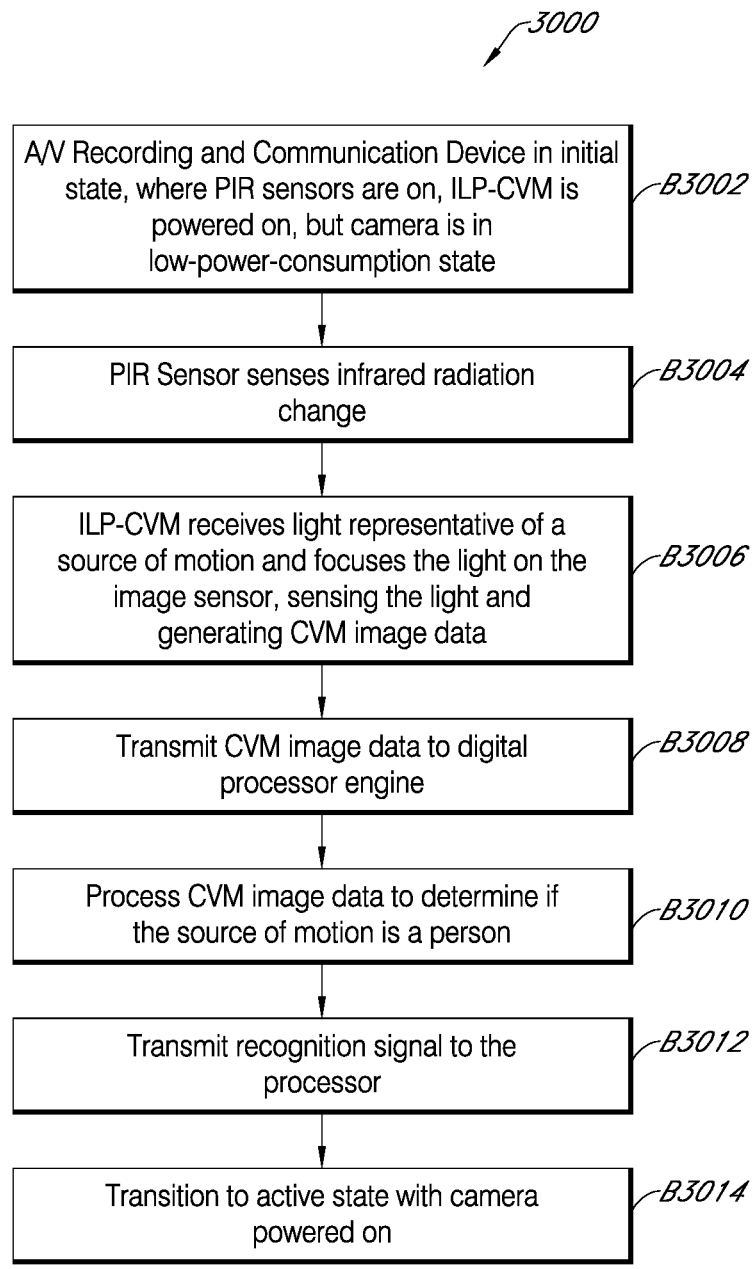
FIG. 30 is a flowchart illustrating one embodiment of a process for sensing motion and controlling power consumption for an A/V device according to various aspects of the present disclosure.

With reference to FIG. 30, in an alternative embodiment 3000 of the process 2900 presented in FIG. 29, the initial state at block B3002 may include having the ILP-CVM 390 in a low-power consumption mode. At block B3004, upon the PIR sensors 344 sensing motion, the ILP-CVM 390 transitions to an active mode. The process 3000 may then continue in a manner similar to the process 2900 set forth in FIG. 29, where the presence of a source of motion is assessed by the processor 363, using input from the PIR sensors 344 and/or the ILP-CVM 390, either in combination or separately, depending upon lighting conditions.

In a further embodiment of the processes 2900, 3000 presented in FIGS. 29 and 30, processing the ILP-CVM 390 image data in the digital processor engine 393 to determine if the source of motion is a person may include processing the image data to determine whether the person is moving toward, away from, or perpendicular to, the A/V device 2230, 2630. This processing may also include determining the number of persons in the image sensor 392 FOV. In a still further embodiment, the processing of the ILP-CVM 390 image data may include using facial recognition software, stored in the memory of the digital processor engine 393 or other readily accessible memory, to determine whether the person's face matches a stored facial image.

As described above, the A/V device 2630 includes an infrared light emitting device 394, such as a light emitting diode. The infrared light emitting device 394 is positioned and configured to project infrared light into the image sensor 392 FOV. This projected infrared light may reflect from objects or persons in the image sensor 392 FOV, and thus improve the performance of the ILP-CVM 390 in certain low-light conditions. While it may be used in any ambient light conditions, it is preferably used during low-light conditions. In using this embodiment, the method of operation 2900 described in the flowchart of FIG. 29 further includes cycling the infrared light emitting device 394 between a low-power-consumption mode, in which the infrared light emitting device 394 emits no infrared light, and an active mode in which the infrared light emitting device 394 emits infrared light. In some embodiments, the infrared light emitting device 394 may transition from the low-power-consumption mode to the active mode at a predetermined frequency and remain in the active mode for a predetermined duration in each cycle. For example, the infrared light emitting device 394 may transition from the low-power-consumption mode to the active mode once every second, and remain in the active mode for 1 millisecond (ms), or 2 ms, or 3 ms, or 4 ms, or 5 ms, or 10 ms, or 15 ms, or 20 ms, or 25 ms, or 30 ms, or 40 ms, or 50 ms, or 100 ms, or 200 ms, or 500 ms, or 1 s, or any other length of time, during each cycle.

Figure 31:
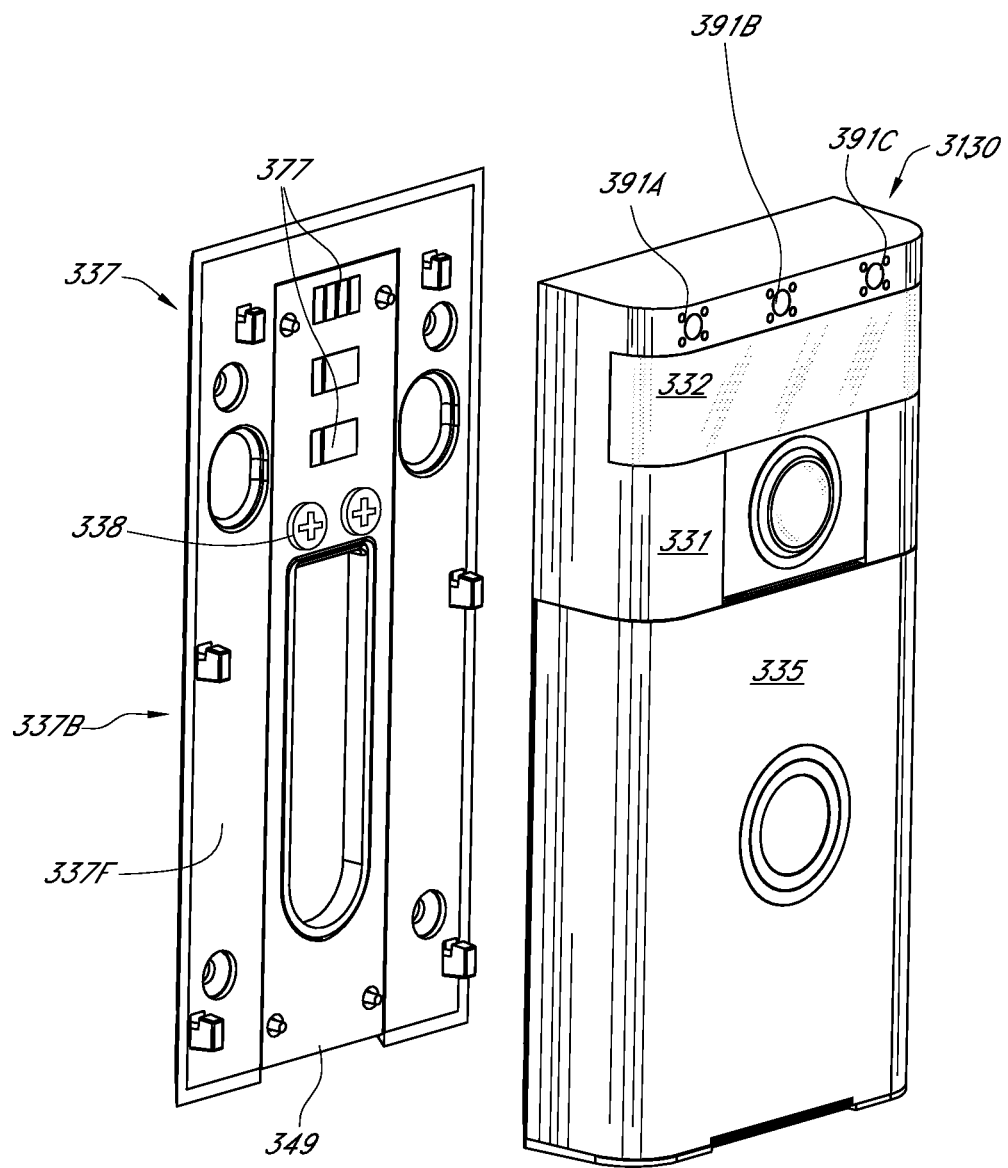
FIG. 31 is an exploded view of another embodiment of the A/V device of FIG. 14 and a mounting bracket.
Figure 32:
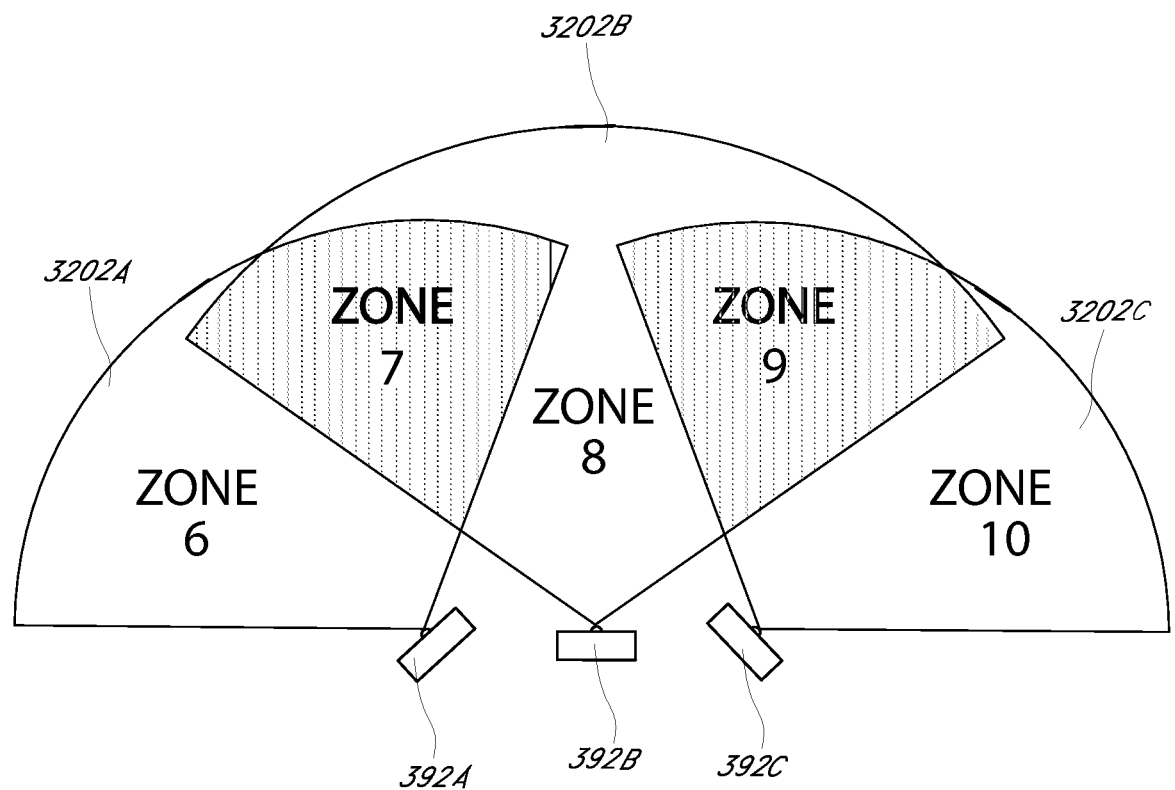
FIG. 32 is a top view of the low-power computer vision module of the A/V device of FIG. 31, according to various aspects of the present disclosure.
Figure 33:
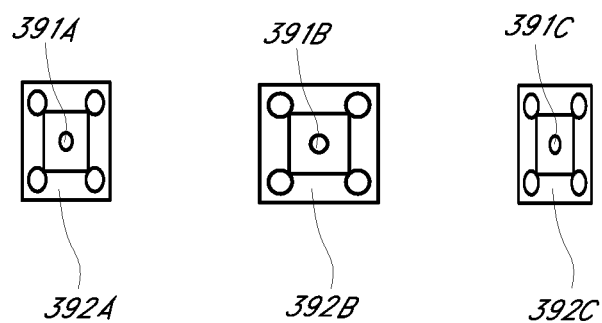
FIG. 33 is a front view of the low-power computer vision module of FIG. 32.

FIGS. 31-33 illustrate another embodiment of an audio/video recording and communication device ("A/V device") 3130 according to aspects of the present disclosure. The A/V device 3130 may be similar to the embodiments of the A/V devices 330, 2230 discussed above. However, with reference to FIGS. 31-33, the A/V device 3130 includes an integrated low-power computer vision module (ILP-CVM) comprising a first lens 391A, a first image sensor 392A with a first image sensor FOV 3202A, a second lens 391B, a second image sensor 392B with a second image sensor FOV 3202B, a third lens 391C, and a third image sensor 392C with a third image sensor FOV 3202C. In various embodiments, the ILP-CVM may be coupled to the passive infrared sensor assembly 379, but in other embodiments the ILP-CVM may be located in another location on or within the A/V device 3130, and may be separate from, and not connected to, the passive infrared sensor assembly 379.

The first image sensor 392A (and/or the second image sensor 392B and/or the third image sensor 392C) may be a complementary metal-oxide semiconductor (CMOS) sensor, but could also be any other suitable image sensor. In some embodiments, when the first image sensor 392A (and/or the second image sensor 392B and/or the third image sensor 392C) is powered on, it may consume less than two milliwatts of power. The first lens 391A, the second lens 391B, and/or the third lens 391C may be substantially flush with, project slightly through, or be recessed within, the enclosure 331 as shown in FIG. 31. The first lens 391A focuses light onto the first image sensor 392A, the second lens 391B focuses light onto the second image sensor 392B, and the third lens 391C focuses light onto the third image sensor 392C. The first image sensor 392A (and/or the second image sensor 392B and/or the third image sensor 392C) is operatively connected to the digital processor engine 393 (and/or one or more additional digital processing engines), which includes circuitry and executable instructions for computer vision processing. In some embodiments, at least a portion of the camera FOV overlaps at least a portion of the first image sensor FOV (and/or the second image sensor FOV and/or the third image sensor FOV). The digital processor engine 393 is operatively coupled to the main processor 363 of the A/V device 3130, such as through a serial peripheral interface (SPI) bus (not shown), or any other connection/interface.

In the example of FIG. 32, the first image sensor 392A has a first FOV 3202A, the second image sensor 392B has a second FOV 3202B, and the third image sensor 392C has a third FOV 3203C. Zone 6 is the area that is visible only to the first image sensor 392A. Zone 7 is the area that is visible to both the first image sensor 392A and the second image sensor 392B. Zone 8 is the area that is visible only to the second image sensor 392B. Zone 9 is the area that is visible to both the second image sensor 392B and the third image sensor 392C. Zone 10 is the area that is visible only to the third image sensor 392C. In some embodiments, the A/V device 3130 may be capable of determining where an object is located based upon which image sensor(s) 392A-392C detect the object, and/or capable of determining the direction that an object is moving based upon which zones are triggered in a time sequence. In some embodiments, the A/V device 3130 may activate the camera 102 when an object is detected in specific zones, but not activate the camera 102 when an object is detected in other zones. Still, in some embodiments, the A/V device 3130 may generate an alert when an object is detected in specific zones, but not generate an alert when an object is detected in other zones.

Although the example of FIGS. 31-33 illustrates the computer vision module as including three image sensors 392A-C and three lenses 391A-C, in other examples the computer vision module may include any number of image sensors 392 and/or lenses 391. Additionally, each image sensor 392 may include a respective FOV that differs from the FOVs of the other image sensors 392. Furthermore, in other examples, the A/V device 3130 may include more than one computer vision module 390. For instance, the A/V device 3130 may include three computer vision modules, where a first computer vision module includes the first image sensor 392A and the first lens 391A, a second computer vision module includes the second image sensor 392B and the second lens 391B, and a third computer vision module includes the third image sensor 392C and the third lens 391C.

In some instances, the computer vision module may combine (e.g., by stitching) image data generated by the image sensors 392. For instance, the first image sensor 392A may generate first image data representing the first image sensor FOV, the second image sensor 392B may generate second image data representing the second image sensor FOV, and the third image sensor 392C may generate third image data representing the third image sensor FOV. The computer vision module (and/or the A/V device 3130) may then combine (e.g., by stitching) the first image data, the second image data, and the third image data to generate fourth image data representing the combined FOVs of the image sensors 392. For instance, the fourth image data may represent panorama images(s), where the panorama image(s) represent the at least a portion of the first image sensor FOV, at least a portion of the second image sensor FOV, and/or at least a portion of the third image sensor FOV.

For example, the computer vision module (and/or the A/V device 3130) may use one or more algorithms associated with image stitching and/or photo stitching to combine the first image data, the second image data, and/or the third image data. In some instances, the one or more algorithms may use keypoint detection, registration, calibration, alignment, blending, and/or any other techniques to combine the first image data, the second image data, and/or the third image data. In some instances, the layout of the fourth image data may be rectilinear, cylindrical, spherical, Panini, stereographic, and/or any other layout.

In some instances, the A/V device 3130 (and/or the computer vision module 390) may store the image data generated by the image sensors 392 (and/or the combined image data) in a memory (e.g., the non-volatile memory 365, the memory 369, etc.). The memory may include a buffer memory (e.g., a rolling buffer(s)), where the A/V device 3130 (and/or the computer vision module 390) continually overwrites image data stored in the memory when new image data is generated by the image sensors 392. For instance, the memory may store the most recent image data generated by the image sensors 392, such as image data generated within a period of time (e.g., five seconds, ten seconds, fifteen seconds, and/or any other period of time). As the image sensors 392 continue to generate new image data, and when the memory is full, the A/V device 3130

(and/or the computer vision module 390) may overwrite the image data stored in the memory with the most recent image data.

In some instances, the A/V device 3130 may send the image data generated by the image sensors 392 and/or the image data generated by the camera 102 to one or more computing devices, such as the server 118 and/or the user client device 114. For instance, the A/V device 3130 may send the image data stored in the memory (e.g., the rolling buffer(s)) that is generated by the image sensors 392. Once the camera 102 is activated and generating image data, the A/V device 3130 may then send the image data generated by the camera 102 to the one or more computing devices. In some instances, the A/V device 3130 may additionally cease storing the image data generated by the image sensors 392 in the rolling buffer(s), and/or cause the image sensors 392 to cease generating the image data, once image data generated by the camera 102 begins to be generated and/or transmitted to the one or more computing devices. For instance, the A/V device 102 may cause the computer vision module to operate in the low-power-consumption mode once image data generated by the camera 102 begins to be generated and/or transmitted to the one or more computing devices.

Figure 34:
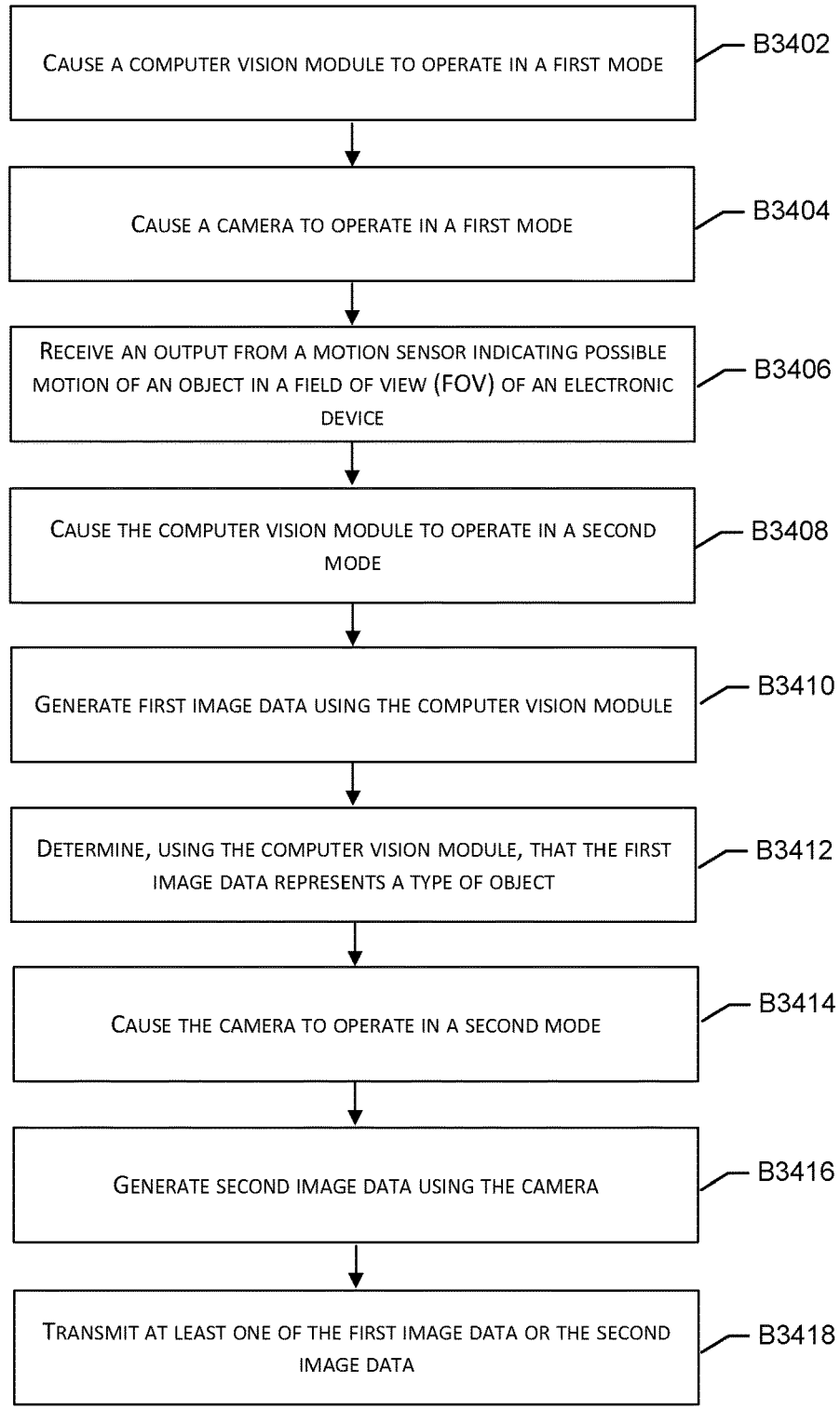
FIG. 34 is a flowchart illustrating one embodiment of a process for using a computer vision module to control power consumption for an A/V) device, according to various aspects to the present disclosure.

FIG. 34 is a flowchart illustrating one embodiment of a process 3400 for using a computer vision module in an A/V device, according to various aspects to the present disclosure. At block B3402, the process 3400 may include causing a computer vision module to operate in a first mode. For instance, an electronic device (e.g., the A/V device 3130) may cause the computer vision module to operate in the first mode. The first mode may be a low-power-consumption mode, such as where the computer vision module is completely powered off, or where the computer vision module is consuming less power than it does when it is generating image data.

At block B3404, the process 3400 may include causing a camera to operate in a first mode. For instance, the A/V device 3130 may cause the camera 102 to operate in the first mode. The first mode may include a low-power-consumption mode, where the camera 102 is completely powered off, or where the camera 102 is consuming less power than it does when it is generating image data.

At block B3406, the process 3400 may include receiving an output from a motion sensor indicating possible motion of an object in a field of view (FOV) of an electronic device. For instance, the A/V device 3130 may receive the output from a motion sensor such as a PIR 344. In some instances, the electronic device (e.g., the A/V device 3130) may be continuously monitoring for motion of objects using the motion sensor. For instance, the A/V device 3130 may keep the motion sensor powered on, while the computer vision module is operating in the first mode and the camera 102 is operating in the first mode.

At block B3408, the process 3400 may include causing the computer vision module to operate in a second mode. For instance, the A/V device 3130 may cause the computer vision module to operate in the second mode. In some instances, the A/V device 3130 causes the computer vision module to operate in the second mode based at least in part receiving the output from the motion sensor indicating the possible motion of the object. In some instances, causing the computer vision module to operate in the second mode may include activating the computer vision module 390, such as by turning the computer vision module to an on state. The computer vision module may use more power operating in the second mode than operating in the first mode.

At block B3410, the process 3400 may include generating first image data using the computer vision module. For instance, the A/V device 3130 may generate, using the computer vision module 390, the first image data. The first image data may represent a FOV of the computer vision module 390. In some instances, the first image data may represent the object detected by the motion sensor. In some instances, such as when the computer vision module includes more than one image sensor 392, the computer vision module may generate respective sets of image data using the image sensors 392. The computer vision module may then generate the first image data using the respective sets of image data generated by the image sensors 392. Still, in some instances, the electronic device and/or the computer vision module may store the first image data in a buffer.

At block B3412, the process 3400 may include determining, using the computer vision module, that the first image data represents a type of object. For instance, the A/V device 3130 may determine, using the computer vision module 390, that the first image data represents the type of object. In some instances, the type of object includes a person. In some instances, based at least in part on determining that the first image data represents the type of object, the computer vision module may send data to the processor 363 indicating that the type of object was detected.

At block B3414, the process 3400 may include causing the camera to operate in a second mode. For instance, the A/V device 3130 may cause the camera 102 to operate in the second mode. In some instances, the A/V device 3130 causes the camera 102 to operate in the second mode based at least in part on the computer vision module determining that the first image data represents the type of object. In some instances, causing the camera 102 to operate in the second mode may include activating the camera 102, such as by turning the camera to an on state. The camera 102 may use more power operating in the second mode than operating in the first mode.

At block B3416, the process 3400 may include generating second image data using the camera. For instance, the A/V device 3130 may generate, using the camera 102, second image data. The second image data may represent a FOV of the camera 102.

At block B3418, the process 3400 may include transmitting at least one of the first image data or the second image data. For instance, the A/V device 3130 may transmit at least one of the first image data or the second image data to one or more computing devices, such as the server 118 and/or the user client device.

In various embodiments, the process 3400 may include causing the computer vision module to operate in the first mode when the camera is operating in the second mode. For instance, after block B3412, and prior to or during the execution of block B3414, the computer vision module may revert to the first mode. This aspect conserves power for the A/V device during the time that the camera is generating image data.

As discussed above, the present disclosure provides numerous examples of methods and systems including A/V doorbells, but the present embodiments are equally applicable for A/V devices other than doorbells. For example, the present embodiments may include one or more A/V security cameras instead of, or in addition to, one or more A/V doorbells. An example A/V security camera may include substantially all of the structure and functionality of the doorbell 130, but without the front button 148, the button actuator 228, and/or the light pipe 232. In another example, the present embodiments may include one or more A/V floodlight controllers instead of, or in addition to, one or more A/V doorbells.

Figure 35:
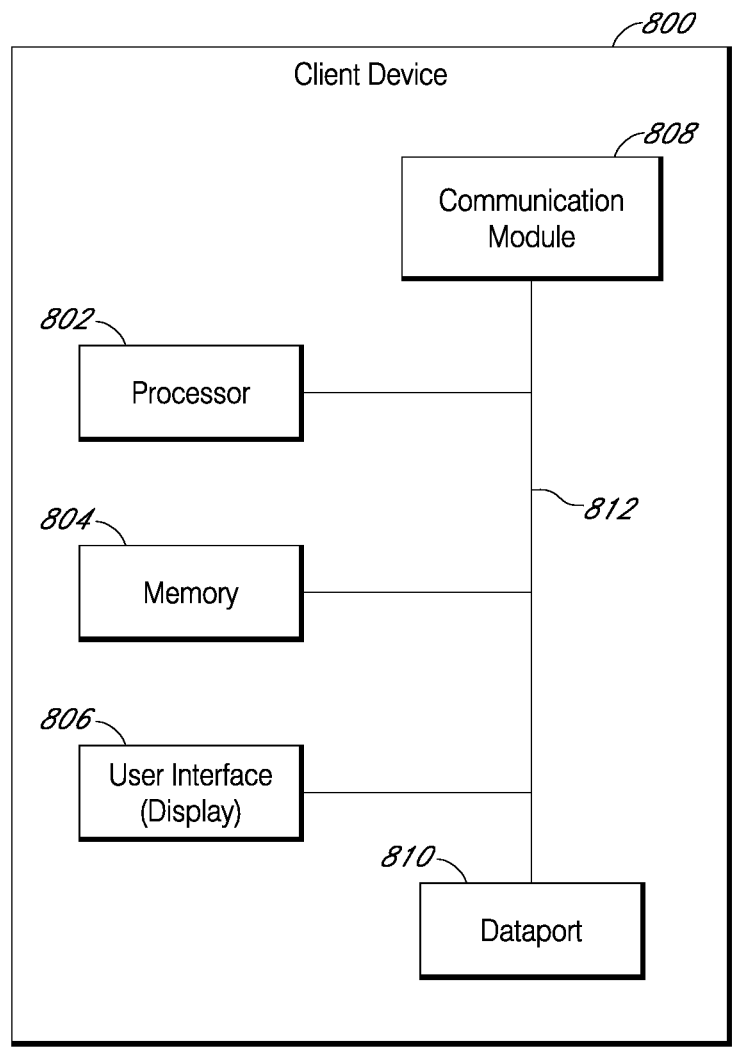
FIG. 35 is a functional block diagram of a client device on which the present embodiments may be implemented according to various aspects of the present disclosure.

FIG. 35 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 35, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 36:
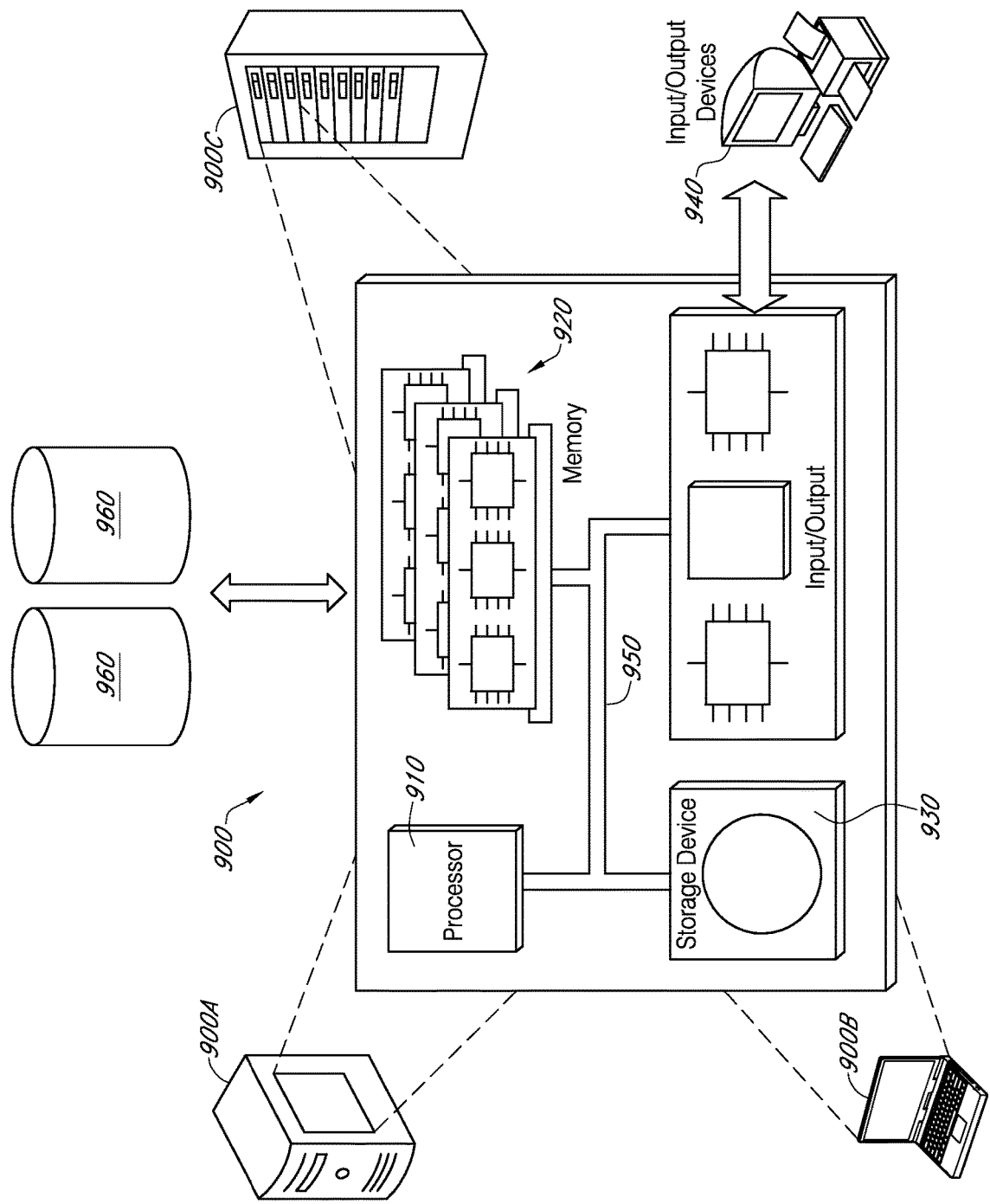
FIG. 36 is a functional block diagram of a general-purpose computing system on which the present embodiments may be implemented according to various aspects of present disclosure.

FIG. 36 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machinereadable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Example Clauses

In a first aspect, a method for a wireless audio/video (A/V) recording and communication device is provided, the device including a processor, at least one passive infrared (PIR) sensor having a PIR sensor field of view, and a plurality of active infrared (AIR) sensors, where each of the AIR sensors has a respective AIR sensor field of view and where at least a portion of the respective AIR sensor fields of view overlap at least a portion of the PIR sensor field of view, the method including maintaining the AIR sensors in a low-power-consumption mode, sensing, with the PIR sensor, motion of an object in the PIR sensor field of view, in response to the sensing of the motion of an object in the PIR sensor field of view, generating a PIR sensor output signal from the PIR sensor, receiving the PIR sensor output signal and, in response, transitioning the AIR sensors to an active mode in which the AIR sensors are configured to sense infrared radiation in their respective AIR sensor fields of view, determining whether the motion of an object is sensed by at least one of the AIR sensors and upon sensing the motion of an object by at least one of the AIR sensors, generating, by the at least one of the AIR sensors, a motion detection signal.

In an embodiment of the first aspect, the low-power consumption mode comprises a powered-off state.

In another embodiment of the first aspect, the method further includes, upon failing to sense the motion of an object by at least one of the AIR sensors, returning the AIR sensors to the low-power-consumption mode.

In a further embodiment of the first aspect, the AIR sensors comprise at least three AIR sensors.

In a further embodiment of the first aspect, the at least one PIR sensor is at least one wide-angle PIR sensor having a wide-angle PIR sensor field of view, and each of the AIR sensors is a narrow-angle AIR sensor having a narrow-angle AIR sensor field of view.

In a further embodiment of the first aspect, the at least one PIR sensor field of view is at least 90 degrees horizontally.

In a further embodiment of the first aspect, the at least one PIR sensor field of view is at least 180 degrees horizontally.

In a further embodiment of the first aspect, the at least one PIR sensor field of view is at least 270 degrees horizontally.

In a further embodiment of the first aspect, each of the respective AIR sensor fields of view is less than 90 degrees horizontally.

In a further embodiment of the first aspect, each of the respective AIR sensor fields of view is less than 60 degrees horizontally.

In a further embodiment of the first aspect, each of the respective AIR sensor fields of view is less than 30 degrees horizontally.

In a second aspect, a method for sensing motion and recording images of persons with an audio/video (A/V) recording and communication device is provided, the device including a first processor, a camera with a camera field of view ("FOV"), and a computer vision module comprising a lens, an image sensor with an image sensor FOV, and a digital processor engine, where the lens focuses light onto the image sensor and the image sensor is operatively connected to the digital processor engine, and where the digital processor engine comprises circuitry and executable instructions for computer vision processing, and where at least a portion of the camera FOV overlaps at least a portion of the image sensor FOV, the method including, when the A/V device is in a sensing mode in which the computer vision module is powered on and the camera is in a low-power-consumption mode, receiving light representative of a source of motion that is in the image sensor FOV, through the lens, and focusing the light representative of the source of motion on the image sensor, sensing the light on the image sensor to generate image data, receiving the image data at the digital processor engine, processing the image data at the digital processor engine to determine if the source of motion is a person, upon determining that the source of motion is a person, transmitting a recognition signal to the first processor, upon receiving the recognition signal at the first processor, causing the A/V device to transition to an active mode in which the computer vision module is powered on and the camera is powered on, and receiving camera image data that is representative of the person in the camera FOV.

An embodiment of the second aspect, the low-power consumption mode comprises a powered-off state.

In another embodiment of the second aspect, the first processor is in the low-power consumption mode when the A/V device is in the sensing mode, and the first processor is powered on when the A/V device is in the active mode.

In a further embodiment of the second aspect, the image sensor is a complementary metal-oxide semiconductor (CMOS) sensor.

In a further embodiment of the second aspect, the digital image processor is operatively coupled to the first processor by a serial peripheral interface (SPI) bus.

In a further embodiment of the second aspect, when the image sensor is powered on, it consumes less than two milliwatts of power.

In a further embodiment of the second aspect, processing the image data in the digital processor engine to determine if the source of motion is a person further includes processing the image data to determine whether the person is moving toward the A/V device.

In a further embodiment of the second aspect, processing the image data in the digital processor engine to determine if the source of motion is a person further includes processing the image data to determine whether the person is moving generally perpendicularly to the A/V device.

In a further embodiment of the second aspect, processing the image data in the digital processor engine to determine if the source of motion is a person further includes processing the image data to determine the number of persons in the image sensor FOV.

In a further embodiment of the second aspect, a facial image is stored in a memory of the digital processor engine, and wherein processing the image data in the digital processor engine to determine if the source of motion is a person further includes facial recognition processing to determine whether the person's face matches the facial image.

In a further embodiment of the second aspect, the A/V device further includes an infrared light emitting device positioned to project infrared light into the image sensor FOV, and the method further includes cycling the infrared light emitting device between a low-power-consumption mode in which the infrared light emitting device emits no infrared light and an active mode in which the infrared light emitting device emits infrared light.

In a further embodiment of the second aspect, the cycling of the infrared light emitting device between the low-power-consumption mode and the active mode occurs once every second, and the infrared light emitting device remains in the active mode for 1 millisecond (ms), or 2 ms, or 3 ms, or 4 ms, or 5 ms, or 10 ms, or 15 ms, or 20 ms, or 25 ms, or 30 ms, or 40 ms, or 50 ms, or 100 ms, or 200 ms, or 500 ms, or 1 s, or any other length of time, during each cycle.

In a further embodiment of the second aspect, the cycling of the infrared light emitting device only occurs during low-light conditions in the image sensor FOV, and where the light representative of a source of motion that is in the image sensor FOV includes infrared light emitted by the infrared light emitting device and reflected by the source of motion.

In a further embodiment of the second aspect, the infrared light emitting device is an infrared light emitting diode.

In a third aspect, a method for sensing motion and recording images of persons with an audio/video (A/V) recording and communication device is provided, the device including a first processor, a camera with a camera field of view ("FOV"), a motion sensor with a motion sensor FOV, and a computer vision module comprising a lens, an image sensor with an image sensor FOV, and a digital processor engine, wherein the lens focuses light onto the image sensor and the image sensor is operatively connected to the digital processor engine, and wherein the digital processor engine comprises circuitry and executable instructions for computer vision processing, and wherein at least a portion of the motion sensor FOV overlaps at least a portion of the image sensor FOV and at least a portion of the camera FOV overlaps at least a portion of the image sensor FOV, the method including, when the A/V device is in a sensing mode in which the motion sensor is powered on, the computer vision module is in a low-power-consumption mode, and the camera is in a low-power-consumption mode, sensing motion, with the motion sensor, from a source of motion within the motion sensor FOV, generating, by the motion sensor, a motion sensor output signal in response to sensing motion in the motion sensor FOV, receiving the motion sensor output signal and, in response, transitioning the computer vision module from the low-power-consumption mode to an active mode, receiving light representative of a source of motion that is in the image sensor FOV, through the lens, and focusing the light representative of a source of motion on the image sensor, sensing the light on the image sensor to generate image data, receiving the image data at the digital processor engine, processing the image data at the digital processor engine to determine if the source of motion is a person, upon determining that the source of motion is a person, transmitting a recognition signal to the first processor, upon receiving the recognition signal at the first processor, causing the A/V device to transition from the low-power-consumption mode to an active mode in which the camera records camera image data and receiving the camera image data that is representative of the person in the camera FOV.

In an embodiment of the third aspect, the low-power consumption mode comprises a powered-off state.

In another embodiment of the third aspect, the motion sensor comprises at least one passive infrared sensor.

In a fourth aspect, an audio/video (A/V) recording and communication device is provided, including at least one passive infrared (PIR) sensor having a PIR sensor field of view, a plurality of active infrared (AIR) sensors, where each of the AIR sensors has a respective AIR sensor field of view, where at least a portion of the respective AIR sensor fields of view overlap at least a portion of the PIR sensor field of view and a processing module operatively connected to the at least one PIR sensor and to the plurality of AIR sensors, the processing module including a processor and a PIR sensor application, where the PIR sensor application configures the processor to maintain the AIR sensors in a low-power-consumption mode, sense, with the PIR sensor, motion of an object in the PIR sensor field of view, in response to the sensing of the motion of an object in the PIR sensor field of view, generate a PIR sensor output signal from the PIR sensor, receive the PIR sensor output signal and, in response, transition the AIR sensors to an active mode in which the AIR sensors are configured to sense infrared radiation in their respective AIR sensor fields of view, determine whether the motion of an object is sensed by at least one of the AIR sensors and upon sensing the motion of an object by at least one of the AIR sensors, generate, by the at least one of the AIR sensors, a motion detection signal.

In an embodiment of the fourth aspect, the low-power consumption mode comprises a powered-off state.

In another embodiment of the fourth aspect, the processor of the device is further configured to, upon failing to sense the motion of an object by at least one of the AIR sensors, return the AIR sensors to the low-power-consumption mode.

In a further embodiment of the fourth aspect, the AIR sensors comprise at least three AIR sensors.

In a further embodiment of the fourth aspect, the at least one PIR sensor is at least one wide-angle PIR sensor having a wide-angle PIR sensor field of view, and each of the AIR sensors is a narrow-angle AIR sensor having a narrow-angle AIR sensor field of view.

In a further embodiment of the fourth aspect, the at least one PIR sensor field of view is at least 90 degrees horizontally.

In a further embodiment of the fourth aspect, the at least one PIR sensor field of view is at least 180 degrees horizontally.

In a further embodiment of the fourth aspect, the at least one PIR sensor field of view is at least 270 degrees horizontally.

In a further embodiment of the fourth aspect, each of the respective AIR sensor fields of view is less than 90 degrees horizontally.

In a further embodiment of the fourth aspect, each of the respective AIR sensor fields of view is less than 60 degrees horizontally.

In a further embodiment of the fourth aspect, each of the respective AIR sensor fields of view is less than 30 degrees horizontally.

In a fifth aspect, an audio/video (A/V) recording and communication device, is provided, including a camera with a camera field of view ("FOV"), a computer vision module comprising a lens, an image sensor with an image sensor FOV, and a digital processor engine, where the lens focuses light onto the image sensor and the image sensor is operatively connected to the digital processor engine, and where the digital processor engine comprises circuitry and executable instructions for computer vision processing, and where at least a portion of the camera FOV overlaps at least a portion of the image sensor FOV, where the executable instructions for computer vision processing configure the computer vision module to, when the A/V device is in a sensing mode in which the computer vision module is powered on and the camera is in a low-power-consumption mode, receive light representative of a source of motion that is in the image sensor FOV, through the lens, and focusing the light representative of the source of motion on the image sensor, sense the light on the image sensor to generate image data, receive the image data at the digital processor engine, process the image data at the digital processor engine to determine if the source of motion is a person and upon determining that the source of motion is a person, transmitting a recognition signal to the first processor, a processing module operatively connected to the camera and the computer vision module, the processing module including a first processor and a camera application, where the camera application configures the first processor to, upon receiving the recognition signal at the first processor, cause the A/V device to transition to an active mode in which the computer vision module is powered on and the camera is powered on and receive camera image data that is representative of the person in the camera FOV.

In an embodiment of the fifth aspect, the low-power consumption mode comprises a powered-off state.

In another embodiment of the fifth aspect, the first processor is in the low-power consumption mode when the A/V device is in the sensing mode, and the first processor is powered on when the A/V device is in the active mode.

In a further embodiment of the fifth aspect, the image sensor is a complementary metal-oxide semiconductor (CMOS) sensor.

In a further embodiment of the fifth aspect, the digital image processor is operatively coupled to the first processor by a serial peripheral interface (SPI) bus.

In a further embodiment of the fifth aspect, when the image sensor is powered on, it consumes less than two milliwatts of power.

In a further embodiment of the fifth aspect, processing the image data in the digital processor engine to determine if the source of motion is a person further includes processing the image data to determine whether the person is moving toward the A/V device.

In a further embodiment of the fifth aspect, processing the image data in the digital processor engine to determine if the source of motion is a person further includes processing the image data to determine whether the person is moving generally perpendicularly to the A/V device.

In a further embodiment of the fifth aspect, processing the image data in the digital processor engine to determine if the source of motion is a person further includes processing the image data to determine the number of persons in the image sensor FOV.

In a further embodiment of the fifth aspect, a facial image is stored in a memory of the digital processor engine, and wherein processing the image data in the digital processor engine to determine if the source of motion is a person further comprises facial recognition processing to determine whether the person's face matches the facial image.

In a further embodiment of the fifth aspect, the device further includes an infrared light emitting device positioned to project infrared light into the image sensor FOV, and the processor is further configured to cycle the infrared light emitting device between a low-power-consumption mode in which the infrared light emitting device emits no infrared light and an active mode in which the infrared light emitting device emits infrared light.

In a further embodiment of the fifth aspect, the cycling of the infrared light emitting device between the low-power-consumption mode and the active mode occurs once every second, and the infrared light emitting device remains in the active mode for 1 millisecond (ms), or 2 ms, or 3 ms, or 4 ms, or 5 ms, or 10 ms, or 15 ms, or 20 ms, or 25 ms, or 30 ms, or 40 ms, or 50 ms, or 100 ms, or 200 ms, or 500 ms, or 1 s, or any other length of time, during each cycle.

In a further embodiment of the fifth aspect, the cycling of the infrared light emitting device only occurs during low-light conditions in the image sensor FOV, and where the light representative of a source of motion that is in the image sensor FOV includes infrared light emitted by the infrared light emitting device and reflected by the source of motion.

In a further embodiment of the fifth aspect, the infrared light emitting device is an infrared light emitting diode.

In a sixth aspect, an audio/video (A/V) recording and communication device is provided, including a camera with a camera field of view ("FOV"), at least one motion sensor, a computer vision module comprising a lens, an image sensor with an image sensor FOV, and a digital processor engine, wherein the lens focuses light onto the image sensor and the image sensor is operatively connected to the digital processor engine, and wherein the digital processor engine comprises circuitry and executable instructions for computer vision processing, and wherein at least a portion of the camera FOV overlaps at least a portion of the image sensor FOV, a processing module operatively connected to the camera and the computer vision module, the processing module including a first processor and a motion sensor application, where the motion sensor application configures the first processor to, when the A/V device is in a sensing mode in which the motion sensor is powered on, the computer vision module is in a low-power-consumption mode, and the camera is in a low-power-consumption mode, sense motion, with the motion sensor, from a source of motion within the motion sensor FOV, generate, by the motion sensor, a motion sensor output signal in response to sensing motion in the motion sensor FOV, receive, by the first processor, the motion sensor output signal and, in response, transition the computer vision module from the low-power-consumption mode to an active mode, where the executable instructions for computer vision processing configure the computer vision module to receive light representative of a source of motion that is in the image sensor FOV, through the lens, and focus the light representative of a source of motion on the image sensor, sense the light on the image sensor to generate image data, receive the image data at the digital processor engine, process the image data at the digital processor engine to determine if the source of motion is a person, upon determining that the source of motion is a person, transmitting a recognition signal to the first processor and where the first processor is further configured to, upon receiving the recognition signal at the first processor, cause the A/V device to transition from the low-power-consumption mode to an active mode in which the camera records camera image data and receive the camera image data that is representative of the person in the camera FOV.

In an embodiment of the sixth aspect, the low-power consumption mode comprises a powered-off state.

In another embodiment of the sixth aspect, the motion sensor comprises at least one passive infrared sensor.

What is claimed is:

1. An audio/video recording and communication device (A/V device) comprising:
   a passive infrared (PIR) sensor;
   a computer vision device that includes at least an image sensor and a digital processing engine;
   a camera;
   a network interface;
   one or more processors; and
   one or more computer-readable media storing instructions that, when executed by the one or more processors, cause the one or more processors to perform operations comprising:
      causing the computer vision device to operate in a first low-power mode;
      causing the camera to operate in a second low-power mode;
      receiving a signal from the PIR sensor;
      determining, using the signal, that the PIR sensor detected possible motion within a first field of view (FOV) of the motion sensor;
      after receiving the signal, causing the computer vision device to operate in a first active mode, the computer vision device using more power when operating in the first active mode than when operating in the first low-power mode;
      generating, using the image sensor, first image data representing a second FOV of the computer vision device;
      determining, using the digital processing engine, that the first image data represents an object;
      determining, using the digital processing engine, that the object includes a person;
      after determining that the object includes the person, causing the camera to operate in a second active mode, the camera using more power when operating in the second active mode than when operating in the second low-power mode;
      generating, using the camera, second image data representing a third FOV of the camera; and
      sending, using the network interface, the second image data to one or more computing devices.

2. The A/V device as recited in claim 1, wherein at least one of:
   causing the computer vision device to operate in the first low-power mode comprises causing the computer vision device to power off; or
   causing the camera to operate in the second low-power mode comprises causing the camera to power off.

3. The A/V device as recited in claim 1, the one or more computer-readable media storing further instructions that, when executed by the one or more processors, cause the one or more processors to perform further operations comprising:
   after determining that the object includes the person, causing the computer vision device to again operate in the first low-power mode; and
   after generating the second image data, causing the camera to again operate in the second low-power mode.

4. An electronic device comprising:
   a motion sensor;
   a first camera;
   a second camera, the second camera using more power than the first camera when activated;
   one or more processors; and
   one or more computer-readable media storing instructions that, when executed by the one or more processors, cause the one or more processors to perform operations comprising:
   receiving a signal from the motion sensor;
   determining, using the signal, that the motion sensor detected possible motion within a first field of view (FOV) of the motion sensor;
   generating, using the first camera, first image data representing a second FOV, the second FOV being different than the first FOV;
   determining that the first image data represents an object;
   determining that the object includes a type; and
   after determining that the object includes the type, generating second image data using the second camera.

5. The electronic device as recited in claim 4, the one or more computer-readable media storing further instructions that, when executed by the one or more processors, cause the one or more processors to perform further operations comprising:
   causing the first camera to operate in a first mode; and
   after receiving the output, causing the first camera to operate in a second mode, the first camera using more power when operating in the second mode than when operating in the first mode,
   wherein generating the first image data occurs while the first camera is operating in the second mode.

6. The electronic device as recited in claim 4, the one or more computer-readable media storing further instructions that, when executed by the one or more processors, cause the one or more processors to perform further operations comprising:
   causing the second camera to operate in a first mode; and
   after determining that the object includes the type, causing the second camera to operate in a second mode, the second camera using more power when operating in the second mode than when operating in the first mode,
   wherein generating the second image data occurs while the second camera is operating in the second mode.

7. The electronic device as recited in claim 4, further comprising a computer vision device, the computer vision device comprising:
   the first camera;
   one or more additional processors; and
   one or more additional computer-readable media storing additional instructions that, when executed by the one or more additional processors, cause the one or more additional processors to perform additional operations comprising transmitting data to the one or more processors, the data indicating that the object includes the type.

8. The electronic device as recited in claim 4, wherein the signal is a first signal, the possible motion is first possible motion, and the object is a first object, and wherein the one or more computer-readable media store further instructions that, when executed by the one or more processors, cause the one or more processors to perform further operations comprising:
   receiving a second signal from the motion sensor;
   determining, using the second signal, that the motion sensor detected second possible motion;
   generating, using the first camera, third image data representing the second FOV;
   determining that the third image data represents a second object;
   determining that the second object does not include the type; and
   after determining that the second object does not include the type, determining not to generate fourth image data using the second camera.

9. The electronic device as recited in claim 4, further comprising a third camera, and wherein the one or more computer-readable media store further instructions that, when executed by the one or more processors, cause the one or more processors to perform further operations comprising:
   generating, using the first camera, third image data representing the second FOV of the first camera;
   generating, using the third camera, fourth image data representing a third FOV of the third camera; and
   generating the first image data using the third image data and the fourth image data.

10. The electronic device as recited in claim 4, further comprising a network interface, and wherein the one or more computer-readable media store further instructions that, when executed by the one or more processors, cause the one or more processors to perform further operations comprising:
    transmitting, using the network interface, the first image data to one or more computing devices; and
    transmitting, using the network interface, the second image data to the one or more computing devices.

11. The electronic device as recited in claim 4, the one or more computer-readable media storing further instructions that, when executed by the one or more processors, cause the one or more processors to perform further operations comprising, after determining that the object includes the type, ceasing generating the first image data using the first camera.

12. The electronic device as recited in claim 4, further comprising a network interface, and wherein the one or more computer-readable media store further instructions that, when executed by the one or more processors, cause the one or more processors to perform further operations comprising:
    storing the first image data in a buffer; and
    after determining that the object includes the type, transmitting, using the network interface, the first image data to one or more computing devices.

13. The electronic device as recited in claim 4, wherein the signal is a first signal, the possible motion is first possible motion, and the object is a first object, and wherein the one or more computer-readable media store further instructions that, when executed by the one or more processors, cause the one or more processors to perform further operations comprising:
    causing the second camera to operate in a first mode;
    after determining that the first object includes the type, causing the second camera to operate in a second mode, wherein the second camera uses more power when operating in the first mode than when operating in the second mode, and wherein the second camera generates the second image data while operating in the second mode;
    after generating the second image data, causing the second camera to once again operate in the first mode;

receiving a second signal from the motion sensor;
determining, the second signal, that the motion sensor detected second possible motion;
generating, using the first camera, third image data representing the second FOV;
determining that the third image data represents a second object;
determining that the second object does not include the type; and
after determining that the second object does not include the type, continuing to operate the second camera in the first mode.

14. The electronic device as recited in claim 4, further comprising:
a computer vision device that includes the first camera and an image processing component,
and wherein the motion sensor includes a passive infrared sensor, the passive infrared sensor being separate from the computer vision module.

15. The electronic device as recited in claim 4, wherein the signal represents a change in voltage output by the motion sensor over a period of time;
the image data represents one or more images depicting the second field of view of the first camera.

16. The electronic device as recited in claim 4, wherein:
the motion sensor uses a first amount of power when activated;
the first camera uses a second amount of power when activated; and
the second camera uses a third amount of power when activated, the third amount of power being greater than the first amount of power and the second amount of power.

17. The electronic device as recited in claim 4, wherein:
the first FOV represents a first physical space of an environment in which the electronic device is located; and
the second FOV represents a second physical space of the environment.

18. A method comprising:
receiving a signal from a motion sensor;
determining, using the signal, that the motion sensor detected possible motion within a first field of view (FOV) of the motion sensor;
generating, using a first camera, first image data representing a second FOV;
determining that the first image data represents an object;
determining that the object includes a type; and
after determining that the object includes the type, generating second image data using a second camera.

19. The method as recited in claim 18, further comprising:
causing the first camera to operate in a first mode; and
after receiving the signal, causing the first camera to operate in a second mode, the first camera using more power when operating in the second mode than when operating in the first mode,
and wherein generating the first image data occurs while the first camera is operating in the second mode.

20. The method as recited in claim 18, further comprising:
causing the second camera to operate in a first mode; and
after determining that the object includes the type, causing the second camera to operate in a second mode, the second camera using more power when operating in the second mode than when operating in the first mode,
and wherein generating the second image data occurs while the second camera is operating in the second mode.

21. The method as recited in claim 18, further comprising:
transmitting the first image data to one or more computing devices; and
transmitting the second image data to the one or more computing devices.

22. The method as recited in claim 18, further comprising:
generating, using the first camera, third image data representing the second FOV of the first camera;
generating, using a third camera, fourth image data representing a third FOV of the third camera; and
generating the first image data using the third image data and the fourth image data.

23. The method as recited in claim 18, wherein the signal is a first signal, the possible motion is first possible motion, and the object is a first object, and wherein the method further comprises:
receiving a second signal from the motion sensor;
determining, using the second signal, that the motion sensor detected second possible motion;
generating, using the first camera, third image data representing the second FOV;
determining that the third image data represents a second object;
determining that the second object does not include the type; and
after determining that the second object does not include the type, determining not to generate fourth image data using the second camera.

* * * * *